(12) United States Patent
Lee et al.

(10) Patent No.: US 12,010,646 B2
(45) Date of Patent: Jun. 11, 2024

(54) DEVICE AND METHOD FOR ALLOCATING DELAY FOR MEDIA PROCESSING AND TRANSMISSION IN MOBILE COMMUNICATION NETWORK

(71) Applicant: Samsung Electronics Co., Ltd., Suwon-si (KR)

(72) Inventors: Hakju Lee, Suwon-si (KR); Kyunghun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 17/158,305

(22) Filed: Jan. 26, 2021

(65) Prior Publication Data
US 2021/0250897 A1 Aug. 12, 2021

(30) Foreign Application Priority Data

Jan. 30, 2020 (KR) .................. 10-2020-0010761

(51) Int. Cl.
*H04W 68/00* (2009.01)
*H04L 1/00* (2006.01)
(Continued)

(52) U.S. Cl.
CPC .......... *H04W 68/005* (2013.01); *H04L 65/65* (2022.05); *H04L 65/75* (2022.05)

(58) Field of Classification Search
CPC ...... H04W 68/005; H04L 65/00; H04L 65/65; H04L 65/75; H04L 47/10
See application file for complete search history.

(56) References Cited

U.S. PATENT DOCUMENTS 8,059,634 B1 * 11/2011 Evans .................. H04L 12/66
370/356
9,998,971 B2 6/2018 Koc et al.
(Continued)

FOREIGN PATENT DOCUMENTS

WO 2010/106075 A1 9/2010

OTHER PUBLICATIONS

Intel et al., "Signaling of Delay Budget Information", 3GPP Draft; 26114_CR0441R2_(REL-16)_S4-181176, 3rd Generation Partnership Project (3GPP), Mobile Competence Centre ; 650, Route, Des Lucioles ; F-06921 Sophia-Antipolis Cedex; France vol. SA WG4, No. Kochi, India; Oct. 15-Oct. 19, 2018 2, XP051562191, Dec. 2, 2018.

(Continued)

*Primary Examiner* — Jenee Holland
(74) *Attorney, Agent, or Firm* — Jefferson IP Law, LLP

(57) ABSTRACT

A method performed by a first terminal is provided. The method includes determining whether a first delay related to the first terminal is necessary, transmitting, to a second terminal, a delay message including first delay information in case that the first delay is necessary, in response to the delay message, receiving, from the second terminal, an allocation message including information on one or more nodes, determining whether information on the first terminal is included in the information on one or more nodes included in the allocation message, and allocating the first delay in case that the information on the first terminal is included in the information on one or more nodes.

16 Claims, 25 Drawing Sheets

(51) Int. Cl.
*H04L 41/50* (2022.01)
*H04L 47/2416* (2022.01)
*H04L 47/283* (2022.01)
*H04L 65/65* (2022.01)
*H04L 65/75* (2022.01)
*H04L 65/80* (2022.01)

(56) References Cited

U.S. PATENT DOCUMENTS

| | | | | |
|---|---|---|---|---|
| 2006/0050705 | A1* | 3/2006 | Kim | H04L 65/65 370/469 |
| 2006/0187967 | A1* | 8/2006 | FitzGerald | H04N 21/8547 370/503 |
| 2007/0036447 | A1* | 2/2007 | Dei | H04N 19/37 375/E7.091 |
| 2007/0058546 | A1* | 3/2007 | Na | H04L 43/0829 370/230 |
| 2007/0165535 | A1* | 7/2007 | Zou | H04L 43/062 370/252 |
| 2008/0013545 | A1* | 1/2008 | Ono | H04L 65/104 370/395.21 |
| 2008/0089327 | A1* | 4/2008 | Lu | H04L 67/06 370/389 |
| 2008/0259966 | A1 | 10/2008 | Baird et al. | |
| 2010/0020713 | A1* | 1/2010 | Frankkila | H04L 65/65 370/252 |
| 2010/0303100 | A1 | 12/2010 | Niamut et al. | |
| 2011/0138080 | A1* | 6/2011 | Steiner | H04J 3/0673 709/248 |
| 2011/0222403 | A1 | 9/2011 | Suh et al. | |
| 2012/0036277 | A1 | 2/2012 | Stokking et al. | |
| 2012/0144056 | A1* | 6/2012 | Stokking | H04L 67/51 709/231 |
| 2012/0170631 | A1* | 7/2012 | Liu | H04L 43/0864 375/224 |
| 2012/0275490 | A1* | 11/2012 | Courtice | H04W 40/246 455/73 |
| 2012/0278845 | A1* | 11/2012 | Ou | H04L 1/1887 725/93 |
| 2013/0229939 | A1* | 9/2013 | Teyeb | H04W 36/30 370/252 |
| 2013/0250779 | A1* | 9/2013 | Meloche | H04L 65/65 370/252 |
| 2013/0250786 | A1* | 9/2013 | Balasaygun | H04L 41/5032 370/252 |
| 2014/0036048 | A1* | 2/2014 | Furbeck | H04W 4/02 348/61 |
| 2014/0106808 | A1* | 4/2014 | Agulnik | H04L 65/65 455/518 |
| 2014/0200041 | A1* | 7/2014 | Juntunen | H04W 4/14 455/466 |
| 2014/0348184 | A1* | 11/2014 | Kure | H04L 65/612 370/503 |
| 2015/0304066 | A1* | 10/2015 | Dutti | H04B 10/27 398/98 |
| 2017/0295029 | A1* | 10/2017 | Li | H04W 84/02 |
| 2017/0366287 | A1* | 12/2017 | Zeng | H04J 3/0667 |
| 2018/0103389 | A1* | 4/2018 | Li | H04W 28/0215 |
| 2018/0337849 | A1* | 11/2018 | Sharma | H04L 65/1069 |
| 2019/0045578 | A1 | 2/2019 | Oyman et al. | |
| 2019/0274186 | A1 | 9/2019 | Oyman et al. | |

OTHER PUBLICATIONS

Extended European Search Report dated Dec. 21, 2022, issued in European Patent Application No. 21747861.9.
International Search Report dated Apr. 21, 2021, issued in an International Application No. PCT/KR2021/001009.

* cited by examiner

| | Delay Parameter | 12.2 | 10.2 | 7.95 | 7.4 | 6.7 | 5.9 | 5.15 | 4.75 | FR | EFR |
|---|---|---|---|---|---|---|---|---|---|---|---|
| MSC | Tmsc | 0.5 | 0.5 | 0.5 | 0.5 | 0.5 | 0.5 | 0.5 | 0.5 | 0.5 | 0.5 |
| | Margin | 0.5 | 0.5 | 0.5 | 0.5 | 0.5 | 0.5 | 0.5 | 0.5 | 0.5 | 0.5 |
| BSC | Tbsc | 0.5 | 0.5 | 0.5 | 0.5 | 0.5 | 0.5 | 0.5 | 0.5 | 0.5 | 0.5 |
| | Tproc | 1.8160 | 1.8320 | 1.9920 | 1.7600 | 2.3600 | 2.024 | 2.0160 | 2.0160 | 1.5 | 1.27 |
| | Margin | 0.5 | 0.5 | 0.5 | 0.5 | 0.5 | 0.5 | 0.5 | 0.5 | 0.5 | 0.5 |
| BTS | Tabisu | 6.625 | 6.625 | 6.625 | 6.6 | 6.625 | 6.625 | 6.63 | 6.625 | 4 | 6.4375 |
| | Trxproc eq | 6.84 | 6.84 | 6.84 | 6.84 | 6.84 | 6.84 | 6.84 | 6.84 | 8.8 | 6.84 |
| | Trxproc ch. dec. | 1.9360 | 1.7440 | 3.880 | 1.3280 | 0.2560 | 0.2400 | 0.232 | 0.2320 | 0 | 1.96 |
| | Margin | 3 | 3 | 3 | 3 | 3 | 3 | 3 | 3 | 3 | 3 |
| | Trftx | 37.5 | 37.5 | 37.5 | 37.5 | 37.5 | 37.5 | 37.5 | 37.5 | 37.5 | 37.5 |
| MS | Tencode | 0.272 | 0.288 | 0.248 | 0.232 | 0.256 | 0.24 | 0.232 | 0.232 | 1.6 | 0.32 |
| | Ttransc | 12.976 | 12.680 | 13.256 | 12.104 | 13.50 | 11.0240 | 9.6560 | 11.240 | 8 | 12.17 |
| | Tsample | 25 | 25 | 25 | 25 | 25 | 25 | 25 | 25 | 20 | 20 |
| | TMargin | 2 | 2 | 2 | 2 | 2 | 2 | 2 | 2 | 2 | 2 |
| | Ta/d | 1 | 1 | 1 | 1 | 1 | 1 | 1 | 1 | 1 | 1 |
| | Total Uplink | 101.0 | 100.5 | 103.3 | 99.4 | 100.3 | 97.5 | 96.1 | 97.7 | 89.4 | 94.5 |

FIG. 8

```
DelayBudgetReport ::=    CHOICE {
                            ENUMERATED {
                                msMinus1280, msMinus640, msMinus320, msMinus160, msMinus80, msMinus40,
                                msMinus20, ms0, ms20, ms40, ms60, ms80, ms160, ms320, ms640, ms1280},
                         ...
                         }
```

FIG. 12

| V | P E | CC | M, Payload Type | Sequence Number |
|---|---|---|---|---|
| Timestamp | | | | |
| Synchronization Source (SSRC) Identifier | | | | |
| Contributing Source (CSRC) Identifier | | | | |

DEVICE AND METHOD FOR ALLOCATING DELAY FOR MEDIA PROCESSING AND TRANSMISSION IN MOBILE COMMUNICATION NETWORK

CROSS-REFERENCE TO RELATED APPLICATION(S)

This application is based on and claims priority under 35 U.S.C. § 119(a) of a Korean patent application number 10-2020-0010761, filed on Jan. 30, 2020, in the Korean Intellectual Property Office, the disclosure of which is incorporated by reference herein in its entirety.

BACKGROUND

1. Field

The disclosure relates to media processing in a mobile communication network. More particularly, the disclosure relates to a device and a method for allocating a delay in media processing and transmission in a mobile communication network.

2. Description of Related Art

To meet the demand for wireless data traffic having increased since deployment of 4G communication systems, efforts have been made to develop an improved 5G or pre-5G communication system. The 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

A mobile communication network achieves maximum quality and capacity by adjusting various parameters related to transmission or reception of each terminal according to a channel condition, in order to fully utilize limited frequency resources and network infrastructure. These parameters include a bit rate, power, frequency, and the like. In particular, when a bit rate is adjusted, parameters, such as a channel coding rate and a modulation scheme, may be linked together and changed.

A DBI signaling technology, which is a technology that meets these requirements, is one of network operation techniques that maintain a target bit rate by adjusting a transmission time rather than by adjusting a bit rate in a situation where a change in a transmission scheme is required due to a change in a channel state. However, DBI provides a basic method to cope with the lack of a wireless section and a residual delay, but has the following problems.

(1) In a network operation of a time division duplex (TDD) scheme in which an uplink and a downlink share and use the same frequency band, there is a high possibility that channel states of uplink and downlink are similar. However, in a network operation of a frequency division duplex (FDD) scheme in which an uplink and a downlink use different frequency bands, uplink and downlink channel states may be different. As illustrated in FIG. 8 and FIG. 10, the direction of a spare delay or an insufficient delay cannot be displayed in a delay signal message format, and the same delay increase or decrease is applied to both directions, so that there is a limitation in efficiently managing radio resources.

A DelayBudgetReport message of FIG. 8 is defined only in a section between a UE and a gNB, and an inquiry/allocation delay indicated in a message of FIG. 10 cannot be checked at a network node located in the middle of a transmission path, such as 5GC and IMS, and therefore cannot be used for overall delay adjustment. In particular, in mobile edge computing (MEC) illustrated in FIG. 5, an additional function may be performed to improve the quality of media or to create a 360-degree image by stitching several images, wherein, if MEC is capable of identifying remaining/shortage information of a delay and using a part of the delay, efficient network operation and service quality may be achieved. It is necessary to extend a delay increase/decrease function, which is available only in a current wireless section, so as to be applied to all end-to-end transmission paths including a wired section.

Additional aspects will be set forth in part in the description which follows and, in part, will be apparent from the description, or may be learned by practice of the presented embodiments.

In accordance with an aspect of the disclosure, an operation method of a first terminal is provided. The method includes determining whether a first delay related to the first terminal is necessary, if the first delay is necessary, transmitting a delay message including first delay information to a second terminal, in response to the delay message, receiving an allocation message including information of one or more nodes, from the second terminal, determining whether information of the first terminal is included in the information of one or more nodes, which is included in the allocation message, and if the information of the first terminal is included, allocating the first delay.

In some examples, the delay message and the allocation message are a real-time transport protocol control protocol (RTCP) message.

In some examples, the RTCP message includes at least one of direction information, allocation information, and information of one or more nodes to be allocated, and the delay message and the allocation message are determined by at least one of the direction information, the allocation information, and the information of one or more nodes to be allocated.

In accordance with another aspect of the disclosure, a method for requesting a delay of a network node is provided. The method includes receiving a delay message for requesting a first delay from a first terminal, determining whether a second delay related to the network node is necessary, if the second delay is necessary, adding second delay information to the delay message, and transmitting, to the second terminal, the delay message to which the second delay information has been added.

In accordance with another aspect of the disclosure, an operation method of a second terminal is provided. The method includes receiving a delay message including delay information of one or more nodes, determining whether delays of the one or more nodes are allocable, if the delays of the one or more nodes are allocable, allocating a delay to an allocable node, and transmitting, to the one or more nodes, an allocation message including information on the allocable node.

In accordance with another aspect of the disclosure a method for allocating a delay of a network node is provided. The method includes receiving, from a second terminal, an allocation message including information of one or more nodes, determining whether information of the network node is included in the information of one or more nodes, which is included in the allocation message, if the information of the network node is included, applying a second delay related to the network node, after the second delay is applied, deleting second delay information from the allocation message, and transmitting a delay message from which the second delay information has been deleted.

In accordance with another aspect of the disclosure a first terminal is provided. The first terminal includes a transceiver capable of transmitting or receiving at least one signal, and a controller coupled with the transceiver, wherein the controller is configured to determine whether a first delay related to the first terminal is necessary, if the first delay is necessary, transmit a delay message including first delay information to a second terminal, in response to the delay message, receive an allocation message including information of one or more nodes, from the second terminal, determine whether information of the first terminal is included in the information of one or more nodes, which is included in the allocation message, and if the information of the first terminal is included, allocate the first delay.

In accordance with another aspect of the disclosure, a network node that requests a delay is provided. The network node includes a transceiver capable of transmitting or receiving at least one signal, and a controller coupled with the transceiver, wherein the controller is configured to receive a delay message for requesting a first delay from a first terminal, determine whether a second delay related to the network node is necessary, if the second delay is necessary, add second delay information to the delay message, and transmit, to a second terminal, the delay message to which the second delay information has been added.

In accordance with another aspect of the disclosure, a second terminal is provided. The second terminal includes a transceiver capable of transmitting or receiving at least one signal, and a controller coupled with the transceiver, wherein the controller is configured to receive a delay message including delay information of one or more nodes, determine whether delays of the one or more nodes are allocable, if the delays of the one or more nodes are allocable, allocate a delay to an allocable node, and transmit, to the one or more nodes, an allocation message including information on the allocable node.

In accordance with another aspect of the disclosure, a network node that allocates a delay is provided. The network node includes a transceiver capable of transmitting or receiving at least one signal, and a controller coupled with the transceiver, wherein the controller is configured to receive, from a second terminal, an allocation message including information of one or more nodes, determine whether information of the network node is included in the information of one or more nodes, which is included in the allocation message, if the information of the network node is included, apply a second delay related to the network node, after the second delay is applied, delete second delay information from the allocation message, and transmit a delay message from which the second delay information has been deleted.

The present disclosure relates to a device and a method for solving technical problems of technologies, which are introduced to cope with a change in a transmission situation, via compression and adjustment of a transmission time in a mobile communication network.

Unlike the technologies in which only a delay in UE and gNB sections can be adjusted, network nodes in the middle of a transmission path can also request the required amount of delay, so that efficient use of delay is possible in the disclosure. A delay request procedure can only be initiated by a terminal, and allocation of a delay is unified to a message reception terminal capable of identifying the entire delay state, so that requests of network nodes and a message transmission UE do not collide.

In a delay RTCP message format proposed in the disclosure, the direction of a requested or allocated delay can be displayed, and therefore radio resources can be efficiently operated compared to the technologies in which the same delay increase or decrease should be applied to both directions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates representative delay values consumed in each section and a voice compressor (encoder) according to an embodiment of the disclosure;

FIG. 8 illustrates a delay in a DelayBudgetReport message format according to an embodiment of the disclosure;

FIG. 12 illustrates Timestamp information of an RTP protocol header according to an embodiment of the disclosure;

The same reference numerals are used to represent the same elements throughout the drawings.

DETAILED DESCRIPTION

Figure 1:
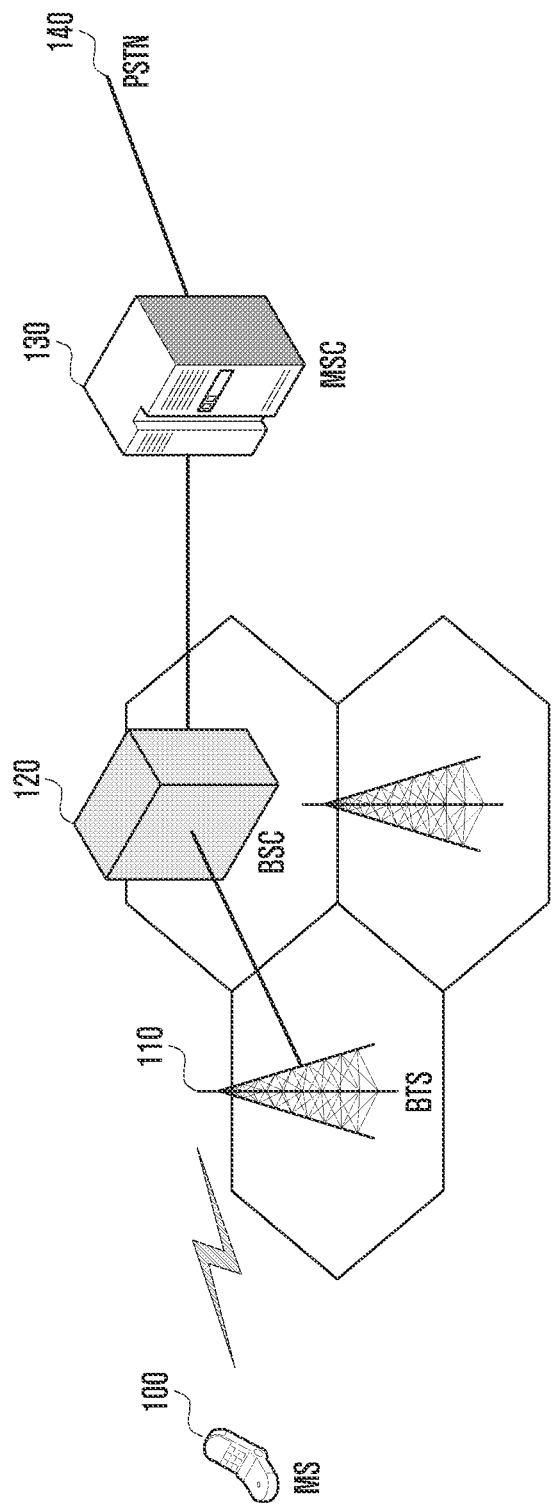
FIG. 1 illustrates a network structure of global system for mobile communication (GSM) that is a digital mobile communication network according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

FIG. 1 illustrates a network structure of global system for mobile communication (GSM) that is a digital mobile communication network according to an embodiment of the disclosure. Referring to FIG. 1, there are a base transceiver station (BTS) 110 that is a base station directly communicating with a terminal (mobile station (MS)) 100, and a base station controller (BSC) 120 that controls several BTSs, in which a bit rate, power, frequency, etc. are adjusted. If a bit rate is adjusted, parameters, such as a channel coding rate and a modulation scheme, are adjusted, and if it is necessary to connect the MS 100 to another BTS, the BSC 120 may perform handover of the MS 100. The BSC 120 may be connected to another mobile communication network and a wired telephone network (public switched telephone network (PSTN)) 140 via a mobile switching center (MSC) 130.

In 2G and 3G circuit-switched type networks, such as GSM and wideband code division multiple access (W-CDMA), if a transmission path of media, such as voice and image, is established before a call, the transmission path is not changed in the middle of the call unless handover is performed, all media data is transmitted via the same path, and the time required for each transmission section and compression of the media is similarly maintained. This is because the transmission path or location information of a transmission/reception terminal is not attached to a compressed media frame, and therefore an end-to-end transmission path allocated in the network should be maintained as it is.

Figure 2:
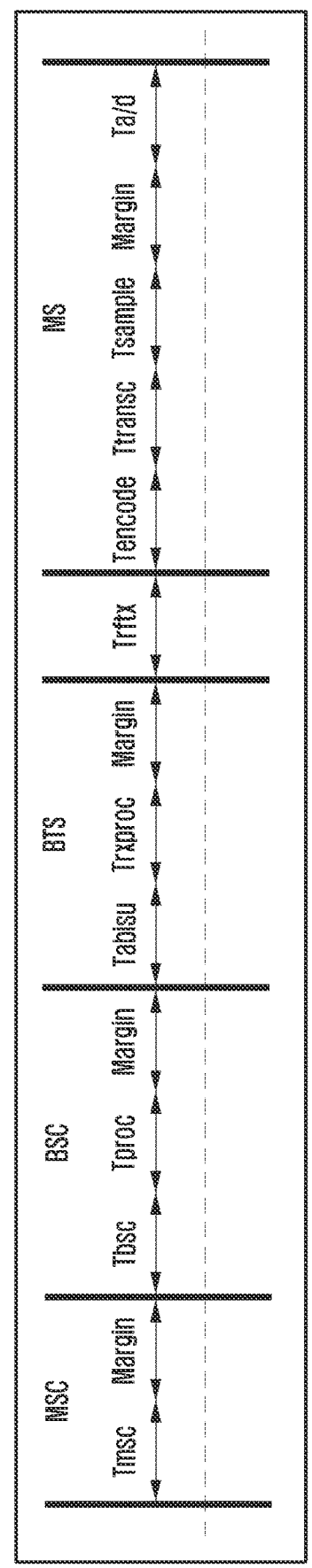
FIG. 2 illustrates a structure for dividing a time (delay) consumed in each transmission section and a voice codec in an uplink (MS→BTS direction) of GSM according to an embodiment of the disclosure.

FIG. 2 illustrates a structure for dividing a time (delay) consumed in each transmission section and a voice codec in an uplink of GSM according to an embodiment of the disclosure.

FIG. 3 illustrates representative delay values consumed in each section and a voice encoder according to an embodiment of the disclosure.

Referring to FIG. 2 and FIG. 3, FIG. 2 shows that time (delay) consumed in each transmission section and a voice codec in an uplink (MS→BTS direction) of GSM may be divided, and FIG. 3 shows representative delay values consumed in each section and a voice compressor (encoder) (3GPP TR 26.975, FIG. 14.1, Table 14.3), wherein, in a circuit network, these values do not change significantly for various situations during a call, and the MS, the BTS, the BSC, and the MSC illustrated in FIG. 1 have no ability to change such delay values.

Figure 4:
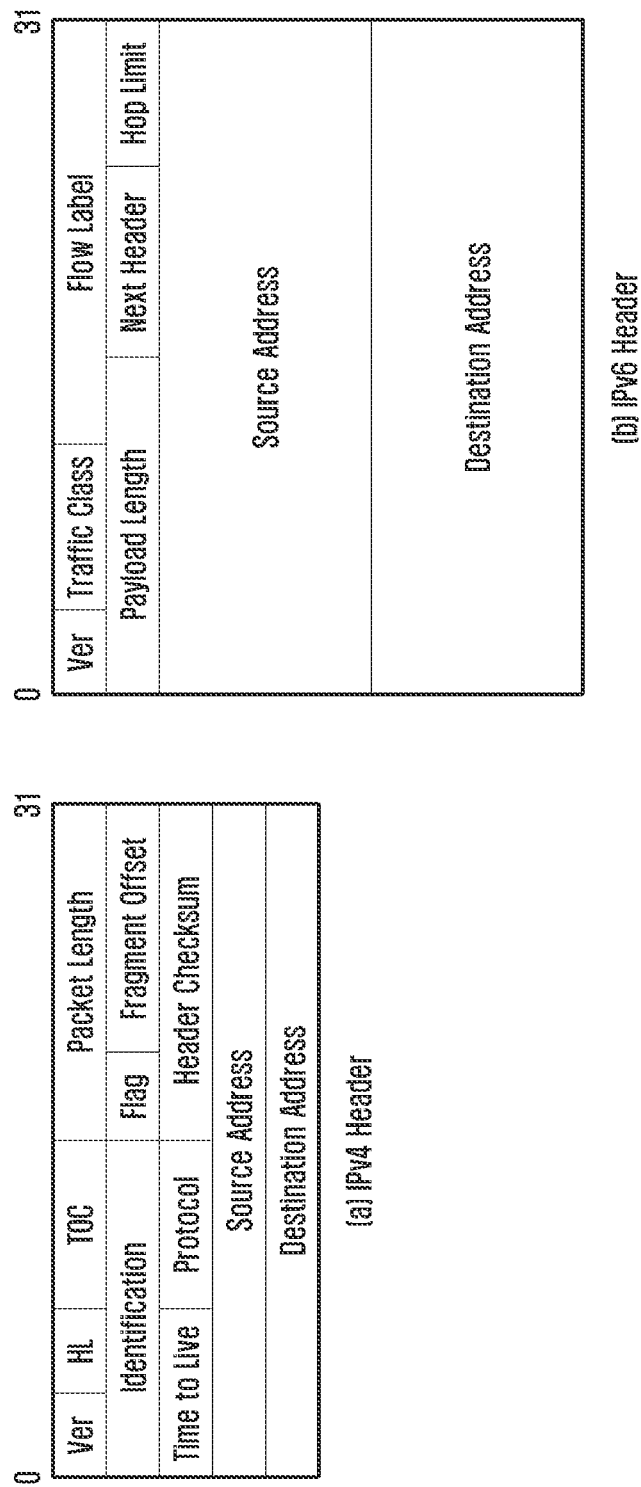
FIG. 4 illustrates a structure of an RTP/UDP/IP header of a compressed media frame in a packet-switched type network according to an embodiment of the disclosure.

FIG. 4 illustrates a structure of an RTP/UDP/IP header of a compressed media frame in a packet-switched type network according to an embodiment of the disclosure.

Referring to FIG. 4, in the packet-switched type network introduced after 4G, an RTP/UDP/IP header is attached to a compressed media frame, wherein the IP header includes all IP addresses (source, destination address) of a transmission/reception terminal, and therefore transmission sections of respective media packets do not necessarily have to be the same. In particular, a base station adjusts delay via scheduling so as to maximize a quality or capacity of media, wherein the delay is in a wireless section with many rapid changes and a wide range of the changes, such as a network load, wake up, or movement of a terminal, compared to a wired section with less changes in transmission conditions. For example, a network may be operated according to a scheme of allocating a large delay to a terminal, which is located in a border area between cells and has a poor transmission/reception state, so as to enable multiple retransmissions to support successful transmission/reception, and allocating a small delay to a terminal in a smoothly connected state near the base station. This delay adjustment should be performed while maintaining the delay equal to or below a maximum delay required for a corresponding service, wherein, for example, in a case of a voice call, a transmission time of a voice signal from a speaker's mouth to a counterpart's ear should be maintained within 280 ms.

Figure 5:
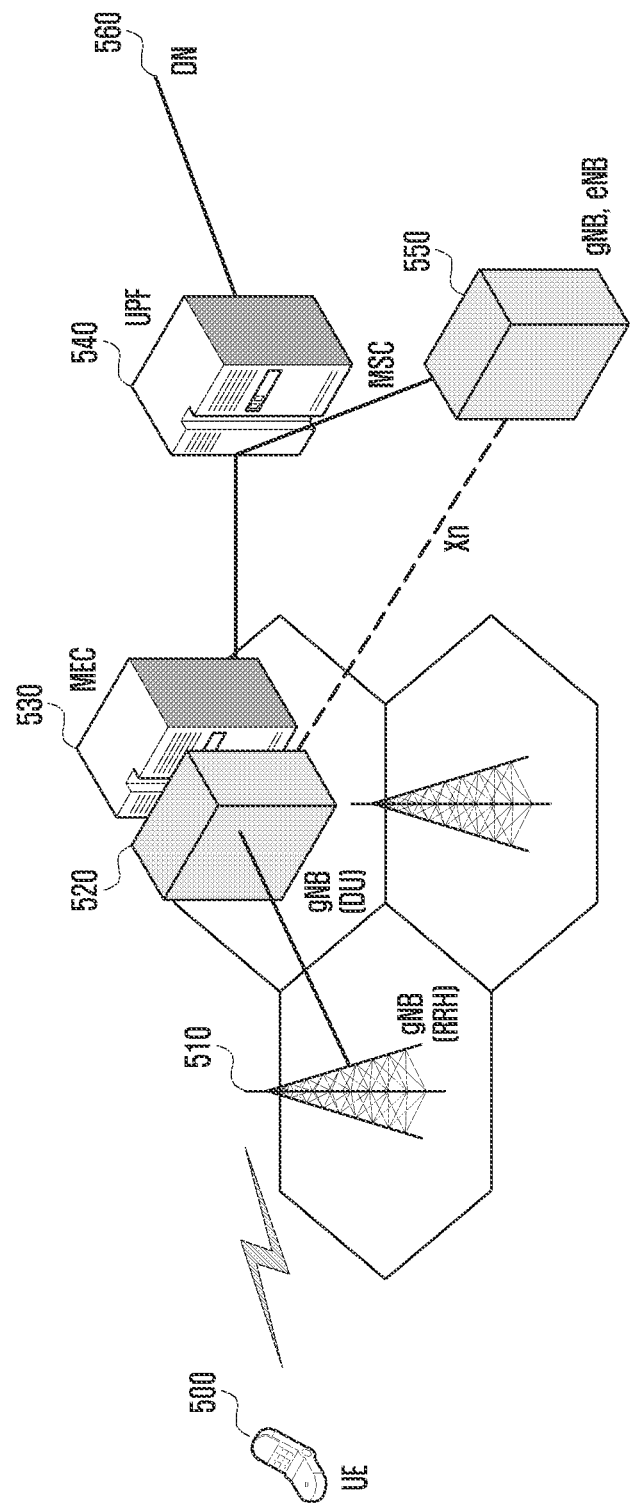
FIG. 5 illustrates a structure of a 5G new radio (NR) network including a terminal (user equipment (UE)), a base station (gNB), a user plane function (UPF), and a data network (DN) according to an embodiment of the disclosure.

FIG. 5 illustrates a structure of a 5G new radio (NR) network according to an embodiment of the disclosure.

Referring to FIG. 5, the 5G NR network includes a terminal (user equipment (UE)) 500, base stations (gNB) 510, 520, and 550, a user plane function (UPF) 540, and a data network (DN) 560. The gNBs 510 and 520 include a remote radio head (RRH) 510 including RF equipment, such as an antenna, and a digital unit (DU) 520 dedicated to digital signal processing, and mobile edge computing (MEC) 530 may be connected to the gNB 520 so as to assist additional processing of media, storage of frequently used data, and the like. An NR network may be connected to other mobile communication networks and a wired telephone network (public switched telephone network (PSTN)) 140 via a DN node.

Figure 6:
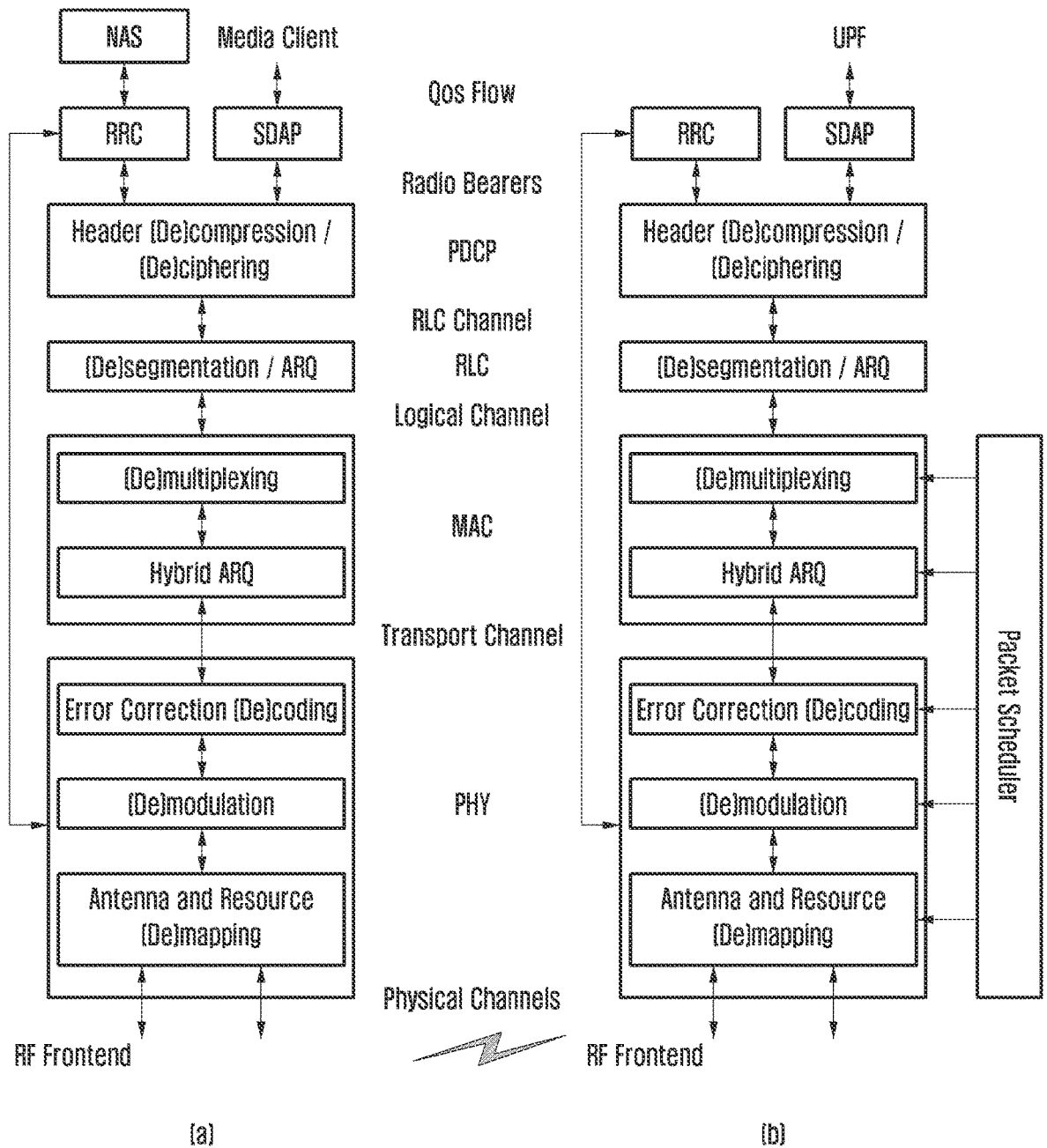
FIG. 6 illustrates a structure of a user plane (UP) protocol used for transmission of a voice and an image frame and a structure of a control plane (CP) protocol used for transmission of a control signal, in NR UE (a) and gNB (b) according to an embodiment of the disclosure.

FIG. 6 illustrates a structure of a user plane (UP) protocol used for transmission of a voice and an image frame and a structure of a control plane (CP) protocol used for transmission of a control signal, in NR UE (a) and gNB (b) according to an embodiment of the disclosure.

Referring to FIG. 6, the UP protocol structure includes a service data adaptation protocol (SDAP), a packet data convergence protocol (PDCP), radio link control (RLC), media access control (MAC), and a physical layer (PHY), and the CP protocol structure includes radio resource control (RRC) and non-access stratum (NAS). A 4G LTE network also has a similar protocol structure except for SDAP which has been first introduced in NR. Adjustment of a transmission delay in a wireless section between the UE and the gNB is handled by MAC of the gNB, wherein an uplink/downlink transmission opportunity of each terminal is determined, and each transmission time and method of each terminal is notified via scheduling grant. The MAC designates a starting point and a width of a frequency band to be used by the UE in subsequent transmission/reception, transmission/reception time and modulation, and a channel coding scheme, and controls a delay of a wireless section via a maximum number of retransmissions (hybrid adaptive repeat and request) to be used in transmission/reception.

However, an end-to-end transmission path of a compressed media packet generally includes two wireless sections (air interface). If the MAC of the gNB is dedicated to delay adjustment, there is a limitation in that a delay of a wireless section of an uplink/downlink of a counterpart UE connected to another gNB cannot be adjusted. In order to solve this problem, a signaling function of delay budget information (DBI) has been introduced in LTE and NR networks. However, there is a problem in that radio resources cannot be efficiently managed by performing overall adjustment of the delay of the end-to-end transmission section, performing support to enable adjustment of utilization delay of each node, such as MEC located in the middle of the transmission path, or independently adjusting the delay in the transmission/reception direction.

Figure 7:
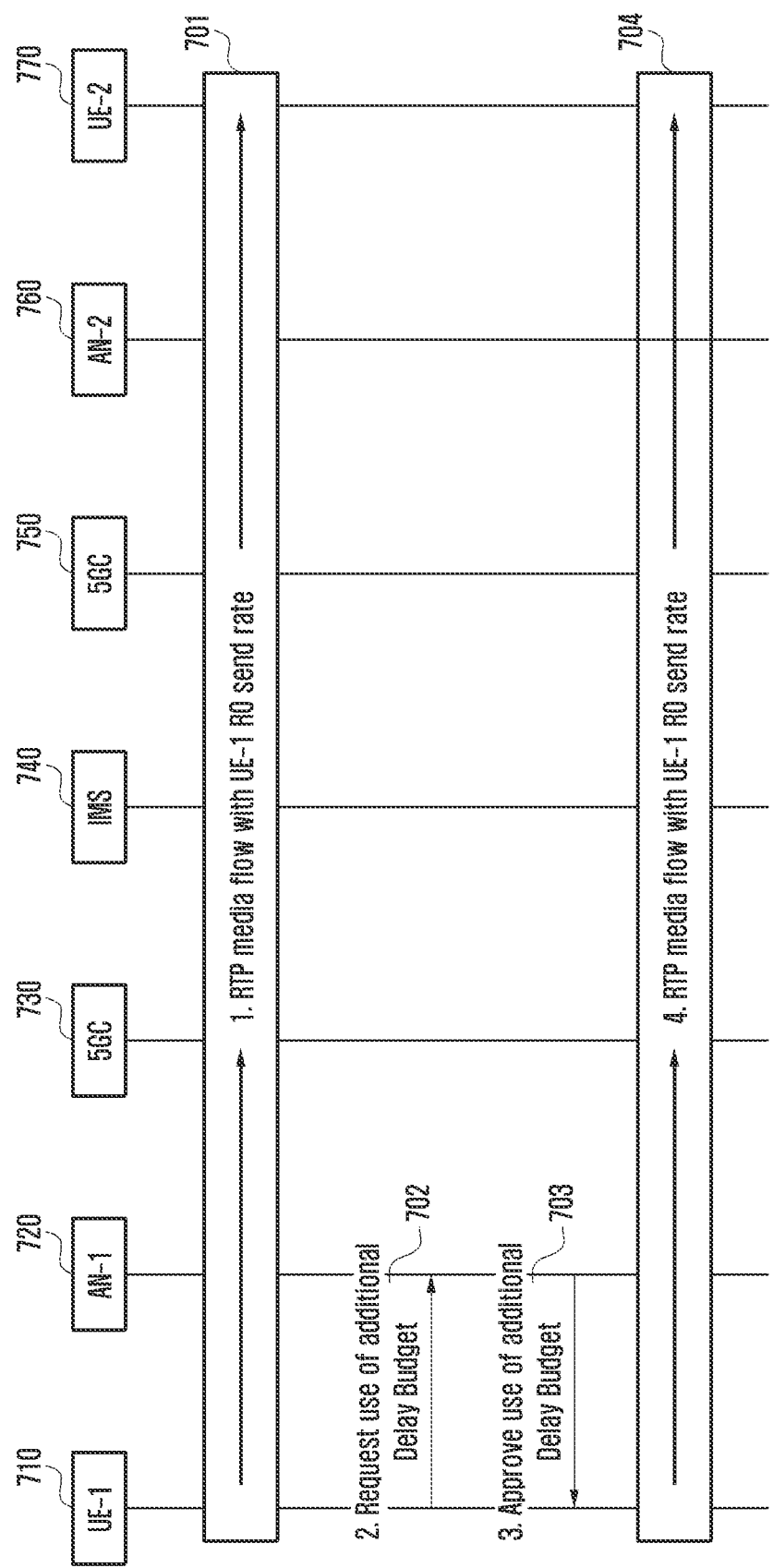
FIG. 7 illustrates an example of a delay budget information (DBI) signaling function according to an embodiment of the disclosure.

FIG. 7 illustrates an example of a delay budget information (DBI) signaling function (3GPP TS 26.114, Annex V) according to an embodiment of the disclosure.

Referring to FIG. 7, Media compressed at RO kbps may be transmitted in a direction from a terminal of UE-1 710 to a counterpart terminal of UE-2 770 at operation 701. RTP/UDP/IP headers are sequentially attached to frames compressed by a media encoder of UE-1 710 so as to be transmitted to a modem, and may be reconstructed by a media decoder of UE-2 through a wired/wireless section. UE-1 710 and UE-2 770 are connected to a radio access network, such as LTE and NR, AN-1 720, and AN-2 760, and each of AN-1 720 and AN-2 760 is connected to a packet core network. A packet core network of NR may be 5GC 730 and 750, and a packet core network of LTE may be enhanced packet core (EPC). In the network structure of FIG. 5, AN-1 720 corresponds to the gNB, and 5GC 730 may include UPF and DN. An IP multimedia subsystem (IMS) 740 may play a role of guaranteeing a quality of service (QoS) of an end-to-end transmission path by connecting two NR networks.

When a channel state of a wireless section between UE-1 710 and AN-1 720 deteriorates, and therefore a percentage of packets, which the AN-1 (720) is unable to successfully receive, increases even after transmission is performed up to a maximum number of retransmissions allowed by gNB, UE-1 710 may request an increase in a transmission delay to be used by the AN-1 720, via an RRC message at operation 702. Accordingly, AN-1 720 may notify of an amount of delay that can be increased at a current level to UE-1 710, via the RRC message at operation 703. The maintained media compressed at RO kbps may be transmitted in the direction from the terminal of UE-1 710 to the counterpart terminal of UE-2 770 at operation 704.

FIG. 8 illustrates a delay in a DelayBudgetReport message format according to an embodiment of the disclosure.

Referring to FIG. 8, in a DelayBudgetReport message format illustrated in FIG. 8, it is possible that delay is adjusted in units of −1280, −640, −320, −160, −80, −60, −40, −20, 0, 20, 40, 60, 80, 160, 320, 640, and 1280 ms (3GPP 36.331 (LTE), 38.331 (NR)). UE-1 increases the number of retransmissions by using a delay increased by AN-1, thereby enabling a transmission rate of RO kbps to be maintained. Therefore, DBI is a technology that responds to the deterioration of a transmission situation, by adjusting a transmission delay rather than adjusting a bit rate, which is a traditional method.

Figure 9:
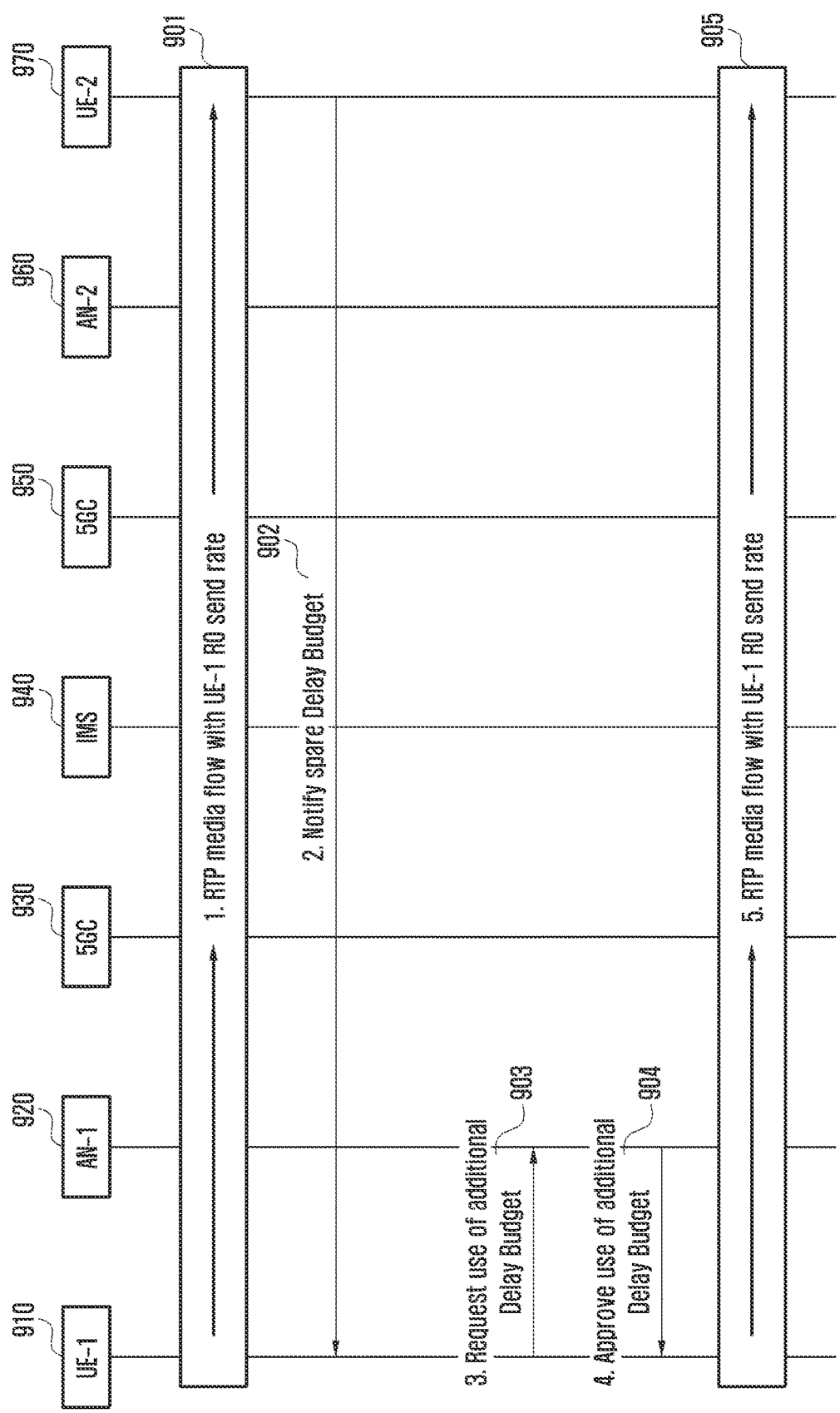
FIG. 9 illustrates another example of the DBI signaling according to an embodiment of the disclosure.

FIG. 9 illustrates another example of the DBI signaling according to an embodiment of the disclosure.

Referring to FIG. 9, in DBI signaling, media compressed at RO kbps may be transmitted in a direction from UE-1 910 to UE-2 970 at operation 90. A channel state of a wireless section between UE-2 970 and AN-2 960 has become smooth, and thus a condition for reducing a delay required for transmission has been achieved. AN-2 960 may transfer a spare amount of delay to UE-2 970 by using the RRC message of FIG. 8, and thus UE-2 970 may transmit the amount of additional delay that UE-1 910 may use, to UE-1 910 by using a 4-byte delay message at operation 902. The delay message may be a delay RTCP message. The message may be included in a real-time control packet (RTCP) packet so as to be transmitted, wherein the RTCP packet is periodically transmitted between UEs to exchange transmission/reception information of a packet.

When a channel state of a wireless section between UE-1 910 and AN-1 920 deteriorates, and therefore a percentage of packets, which the AN-1 (920) is unable to successfully receive, increases even after transmission is performed up to a maximum number of retransmissions allowed by gNB, UE-1 910 may request an increase in a transmission delay to be used by the AN-1 920, via an RRC message at operation 903. Accordingly, AN-1 920 may notify of an amount of delay that can be increased at a current level to UE-1 910, via the RRC message at operation 904. The maintained media compressed at RO kbps may be transmitted in the direction from the terminal of UE-1 910 to the counterpart terminal of UE-2 970 at operation 905.

Figure 10:
FIG. 10 illustrates a delay field including 16 bits according to an embodiment of the disclosure.

FIG. 10 illustrates a delay field including 16 bits according to an embodiment of the disclosure.

Referring to FIG. 10, a delay field configured by 16 bits may indicate −215~215 (32768) ms, and a sign (S) bit may indicate +(1) and −(0). A query (Q) bit is configured to 1 when a message is for querying about a current situation of a delay, and may be configured to 0 when the current situation is notified as shown in FIG. 9. UE-1 having received an RTCP message may inquire with AN-1 if the amount of delay may be additionally used in transmission/reception to/from AN-1, and AN-1 may approve the use.

Figure 11:
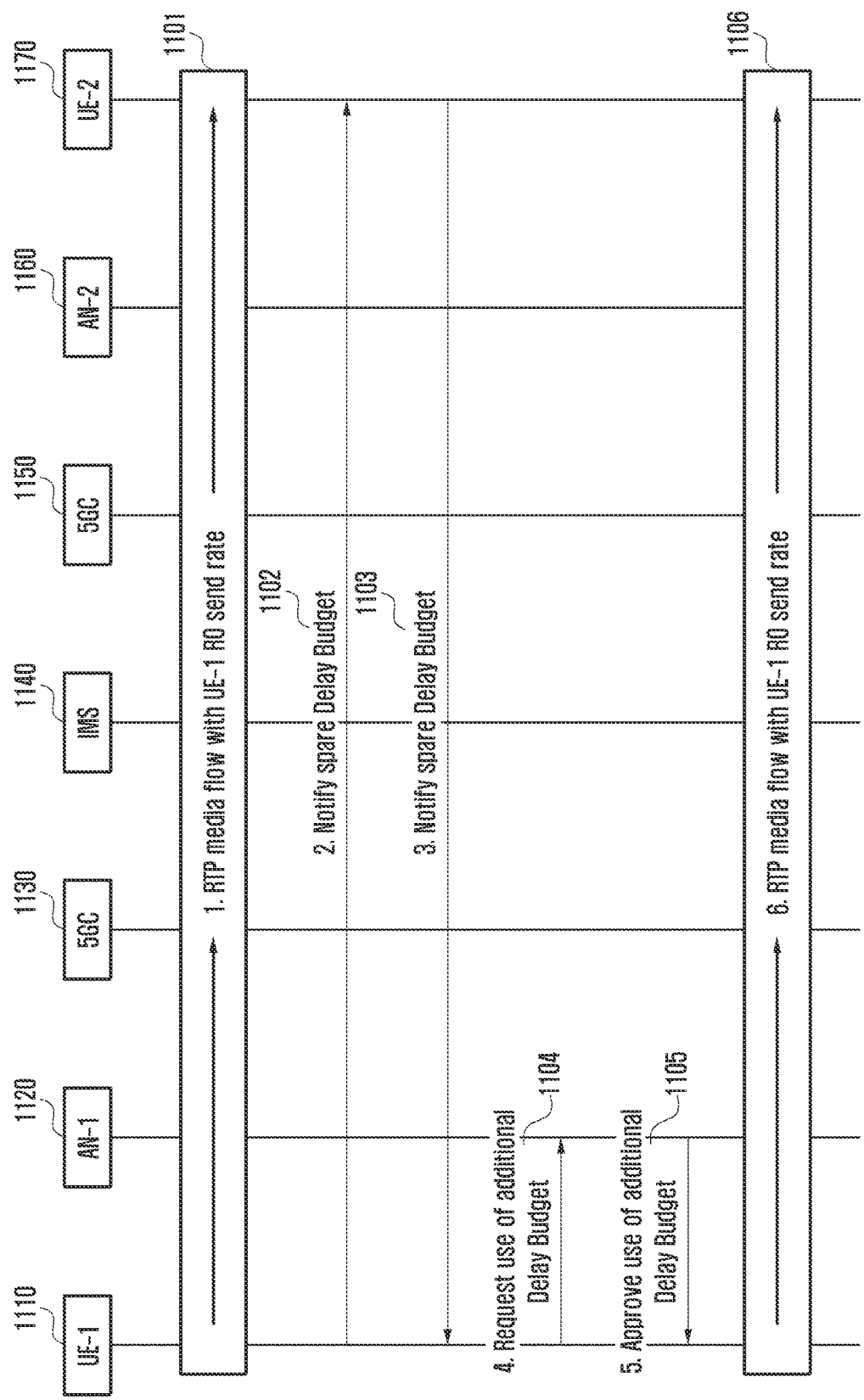
FIG. 11 illustrates another example of the DBI signaling function according to an embodiment of the disclosure.

FIG. 11 illustrates another example of the DBI signaling function according to an embodiment of the disclosure.

FIG. 12 illustrates Timestamp information of an RTP protocol header according to an embodiment of the disclosure.

Referring to FIG. 11, in a DBI signaling function, media compressed at RO kbps may be transmitted in a direction from UE-1 1110 to UE-2 1170 at operation 1101. When a state of a wireless section between UE-1 1110 and AN-1 1120 is deteriorated, and therefore a percentage of packets, which AN-1 1120 is unable to successfully receive, increases even after transmission is performed up to a maximum number of allowed retransmissions, UE-1 1110 may inquire about the amount of delay available to UE-2 1170 via an RTCP message at operation 1102. Accordingly, UE-2 1170 having a smooth channel state may notify of a level of a spare delay, which is estimated using Timestamp information of an RTP protocol header illustrated in FIG. 12, by using the RTCP message at operation 1103. UE-1 1110 having received the same may negotiate with AN-1 1120 so as to use the spare delay.

When a channel state of a wireless section between UE-1 1110 and AN-1 1120 deteriorates, and therefore a percentage of packets, which the AN-1 1120 is unable to successfully receive, increases even after transmission is performed up to a maximum number of retransmissions allowed by gNB, UE-1 1110 may request an increase in a transmission delay to be used by the AN-1 1120, via an RRC message at operation 1104. Accordingly, AN-1 1120 may notify of an amount of delay that can be increased at a current level to UE-1 1110, via the RRC message at operation 1105. The maintained media compressed at RO kbps may be transmitted in the direction from the terminal of UE-1 1110 to the counterpart terminal of UE-2 1170 at operation 1106.

Accordingly, the DBI signaling technology is one of network operation techniques that maintain a target bit rate by adjusting a transmission time rather than by adjusting a bit rate in a situation where a change in a transmission scheme is required due to a change in a channel state.

In a network operation of a time division duplex (TDD) scheme in which an uplink and a downlink share and use the same frequency band, there is a high possibility that channel states of uplink and downlink are similar. However, in a network operation of a frequency division duplex (FDD) scheme in which an uplink and a downlink use different frequency bands, uplink and downlink channel states may be different. In the delay signal message format illustrated in FIG. 8 and FIG. 10, the direction of a spare delay or an insufficient delay cannot be displayed, and the same delay increase or decrease is applied to both directions, so that there is a limitation in efficiently managing radio resources.

A DelayBudgetReport message of FIG. 8 is defined only in a section between a UE and a gNB, and an inquiry/allocation delay indicated in a message of FIG. 10 cannot be checked at a network node located in the middle of a transmission path, such as 5GC and IMS, and therefore cannot be used for overall delay adjustment. In particular, in the MEC illustrated in FIG. 5, an additional function may be performed to improve the quality of media or to create a 360-degree image by stitching several images, wherein, if MEC is capable of identifying remaining/shortage information of a delay and using a part of the delay, efficient network operation and service quality may be achieved. It is necessary to extend a delay increase/decrease function, which is available only in a current wireless section, so as to be applied to all end-to-end transmission paths including a wired section.

Figure 13:
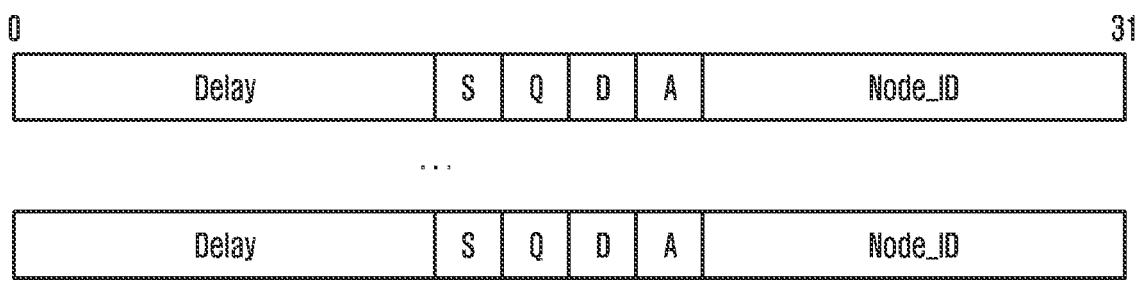
FIG. 13 illustrates a delay RTCP message proposed in the disclosure according to an embodiment of the disclosure.

FIG. 13 illustrates a delay RTCP message proposed in the disclosure according to an embodiment of the disclosure.

Referring to FIG. 13, a delay RTCP message is illustrated. As in the delay message of FIG. 10, a delay field configured by 16 bits may indicate −215 to 215 (32768) ms, and an S bit may indicate +(1) and −(0). A Q field may be configured to 1 when the message is for querying about a current situation of a delay. A direction (D) bit may be configured to 1 if the D bit indicates a delay (uplink delay, UD) in a direction from a source (included in the IP address of FIG. 4) to a destination, and the D bit may be configured to 0 if the D bit indicates a delay (downlink delay, DD) in a direction from the destination to the source. An A bit may be configured to 1 if a UE having received the delay RTCP message reflects a request of a UE or node that has first transmitted the delay RTCP message.

A Node_ID field configured by 12 bits is used to identify a UE and a network node. In the field, unlike the delay RTCP message of FIG. 10, information may be added or removed, wherein the information is obtained by including, by network nodes in a transmission section, respective delay-related requests in an RTCP packet created and transmitted by a UE. Therefore, when adding two-way delay information, the UE or the network node adds 8 bytes, and if a requested delay is allocated, the UE or the network node reflects the same, removes information related to itself from the received delay RTCP message, and then forwards the information related to itself to a subsequent node.

In the disclosure, a UE transmits a delay RTCP message for requesting or notifying of a spare delay, network nodes add, to the delay RTCP message, information of their own current situations of the delay, and a counterpart UE having received the delay RTCP message integrates the current situations of the delay in all transmission paths, so that the spare delay may be efficiently distributed to all nodes in the transmission path.

Figure 14:
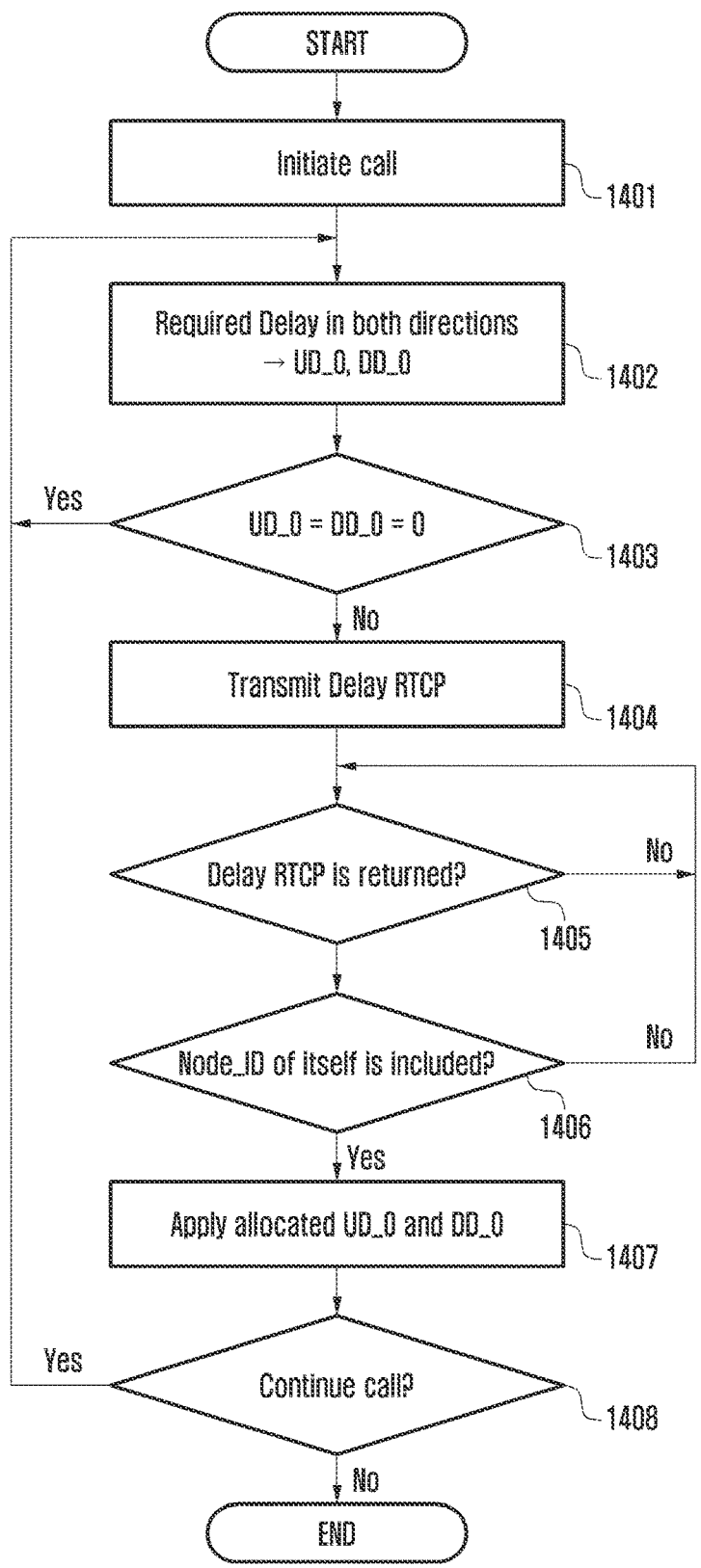
FIG. 14 illustrates an operation of a UE configuring and transmitting a delay RTCP message according to an embodiment of the disclosure.

FIG. 14 illustrates an operation of a UE configuring and transmitting a delay RTCP message according to an embodiment of the disclosure.

Referring to FIG. 14, a call may be initiated at operation 1401. A UE monitoring a transmission/reception state may check a delay state of an uplink/downlink, may determine whether there is a currently required or spare delay (whether a transmission time is reducible), and may store a necessary or spare delay value in each of UD_0 and DD_0 at operation 1402. It is determined whether the stored values of UD_0 and DD_0 are 0 at operation 1403. If both UD_0 and DD_0 are 0, 1402 is performed again. If both UD 0 and DD 0 are not 0, the delay RTCP may be configured and transmitted at operation 1404. If more delay is required, an S bit may be configured to 1, and if there is a spare delay (if the transmission time is reducible), the S bit may be configured to 0.

The transmitted delay RTCP message arrives at the counterpart UE via the network nodes in the transmission path. A counterpart UE returns the delay RTCP message with delay related requests added thereto at operation 1405. The UE having received the returned delay RTCP message may determine whether there is a message corresponding to Node_ID of itself at operation 1406. The counterpart UE may prioritize other nodes according to a spare delay situation, and may not allocate the delay requested by the UE. In this case, until the requested delay is secured, the counterpart UE may either reserve a 4-byte return associated with the Node_ID of the UE or perform returning by configuring the spare delay value to 0. If the delay RTCP message including Node_ID of the UE itself is attached, the UE may apply the allocated values of UD_0 and DD_0 values at operation 1407. Specifically, the UE may apply the allocated values of UD_0 and DD_0 to transmission/reception, via procedures, such as operation 702 and operation 703 of FIG. 7 and operation 903 and operation 904 of FIG. 9. Thereafter, whether to continue the call may be determined at operation 1408. If the call continues, operation 1402 is performed.

Figure 15:
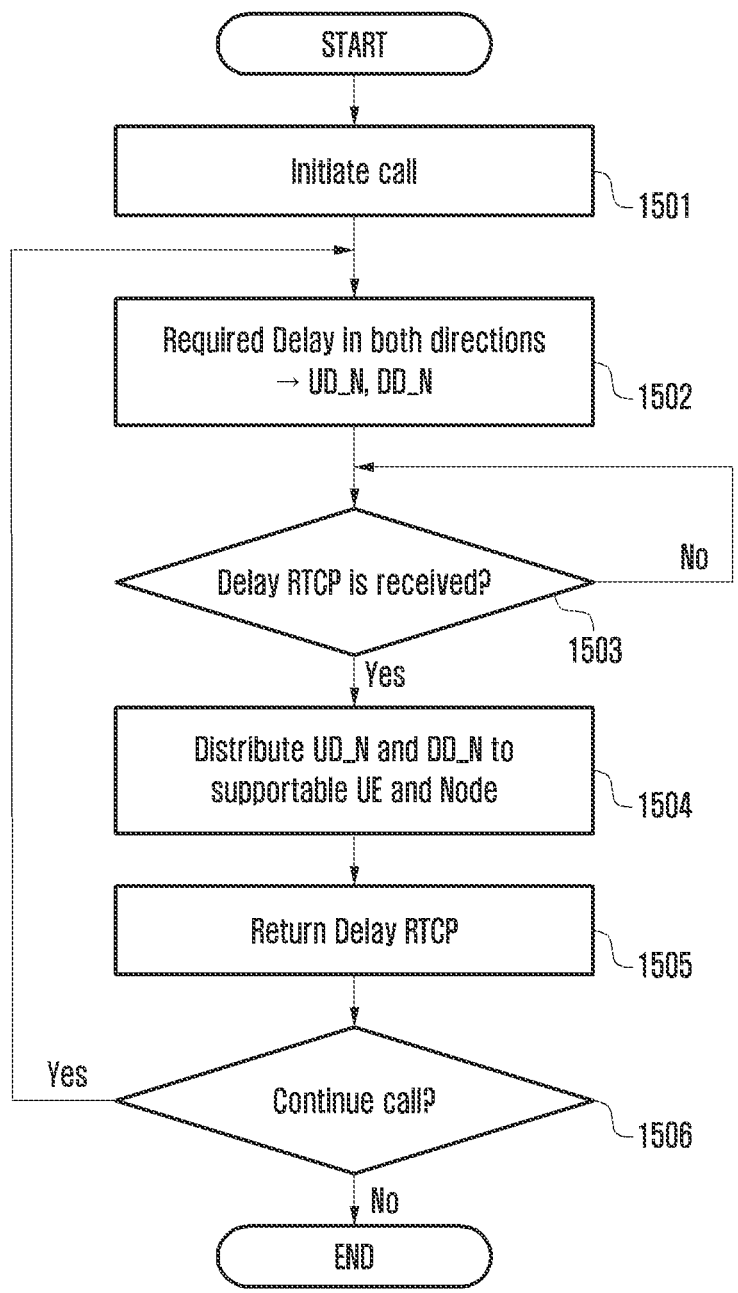
FIG. 15 illustrates an operation of a UE that processes and returns a delay RTCP message received via network nodes in a transmission path according to an embodiment of the disclosure.

FIG. 15 illustrates an operation of a UE that processes and returns a delay RTCP message received via network nodes in a transmission path according to an embodiment of the disclosure.

Referring to FIG. 15, a call may be initiated at operation 1501. A UE monitoring a transmission/reception state may check a delay state of an uplink/downlink, and may store spare delay values in UD N and DD N, respectively at operation 1502. In the disclosure, it is assumed that N-1 of network nodes existing between two UEs can adjust the delay. A two-way delay of an i-th network node is referred to as UD_i and DD_i, and a delay RTCP message may be received at operation 1503. Here, the UE corresponds to an N-th node.

The UE may distribute the determined spare delay to each node and the UE of the received delay RTCP message at operation 1504. If the requested delay can be provided, an A bit may be configured to 1. If the spare delay is insufficient to accept all requests, a delay field may be configured to 0 for returning, or a 4-byte message corresponding to the Node_ID may be deleted from an RTCP packet at operation 1505. Thereafter, whether to continue the call may be determined at operation 1506. If the call continues, operation 1502 is performed.

Figure 16:
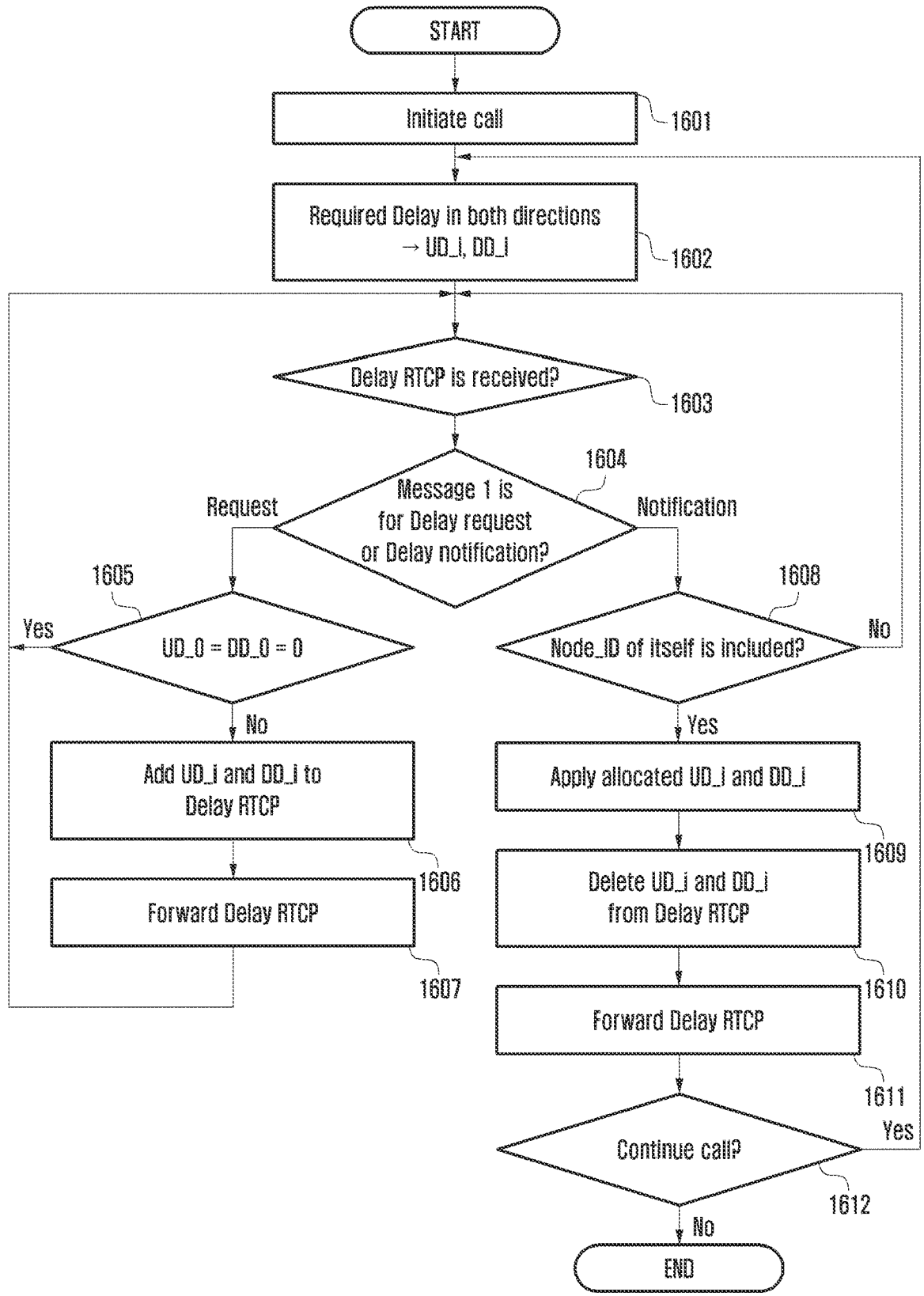
FIG. 16 illustrates procedures for processing a delay RTCP message by network nodes located in a transmission path between two UEs according to an embodiment of the disclosure.

FIG. 16 illustrates a procedure for processing a delay RTCP message by network nodes located in a transmission path between two UEs according to an embodiment of the disclosure.

Referring to FIG. 16, a call may be initiated at operation 1601. An i-th node monitoring a transmission/reception state may check a two-way delay level, and may store necessary or remaining delay values in UD_i and DD_i, respectively at operation 1602. Thereafter, whether a delay RTCP message has been received may be determined at operation 1603. If a delay RTCP message is received, it may be determined whether the message is being transmitted to another UE after one UE transmits the message for a delay request, or whether the message is being returned for processing of the received delay request at operation 1604. Whether the message is being transmitted to another UE after one UE transmits the message for the delay request, or whether the message is being returned for processing of the received delay request may be determined via a Q bit of delay information input by a counterpart UE.

In a case of a request, it may be determined whether both UD_i and DD_i are 0 at operation 1605. If both UD_0 and DD_0 are 0, operation 1603 is performed again. If both UD_i and DD_i are not 0, UD_i and DD_i values may be added to the delay RTCP message at operation 1606. Thereafter, the delay RTCP message including the added UD_i and DD_i may be forwarded to a subsequent node at operation 1607. Then, operation 1603 is performed.

In the case of a notification, the reception UE returns the message to allocate a delay via the procedures illustrated in FIG. 15, and thus whether there is Node_ID of itself (the i-th node) may be determined at operation 1608. If Node_ID of itself does not exist, operation 1603 is performed again. On the other hand, if the Node_ID exists, UD_i and DD_i included in the message may be applied to a corresponding section at operation 1609. Thereafter, 4 or 8 bytes including delay information of the UE itself, such as Node_ID, UD_i, and DD_i, may be deleted from the delay RTCP message at operation 1610. The delay RTCP message including deleted information may be forwarded to a subsequent node at operation 1611. Thereafter, whether to continue the call may be determined at operation 1612. If the call continues, operation 1602 is performed.

Figure 17:
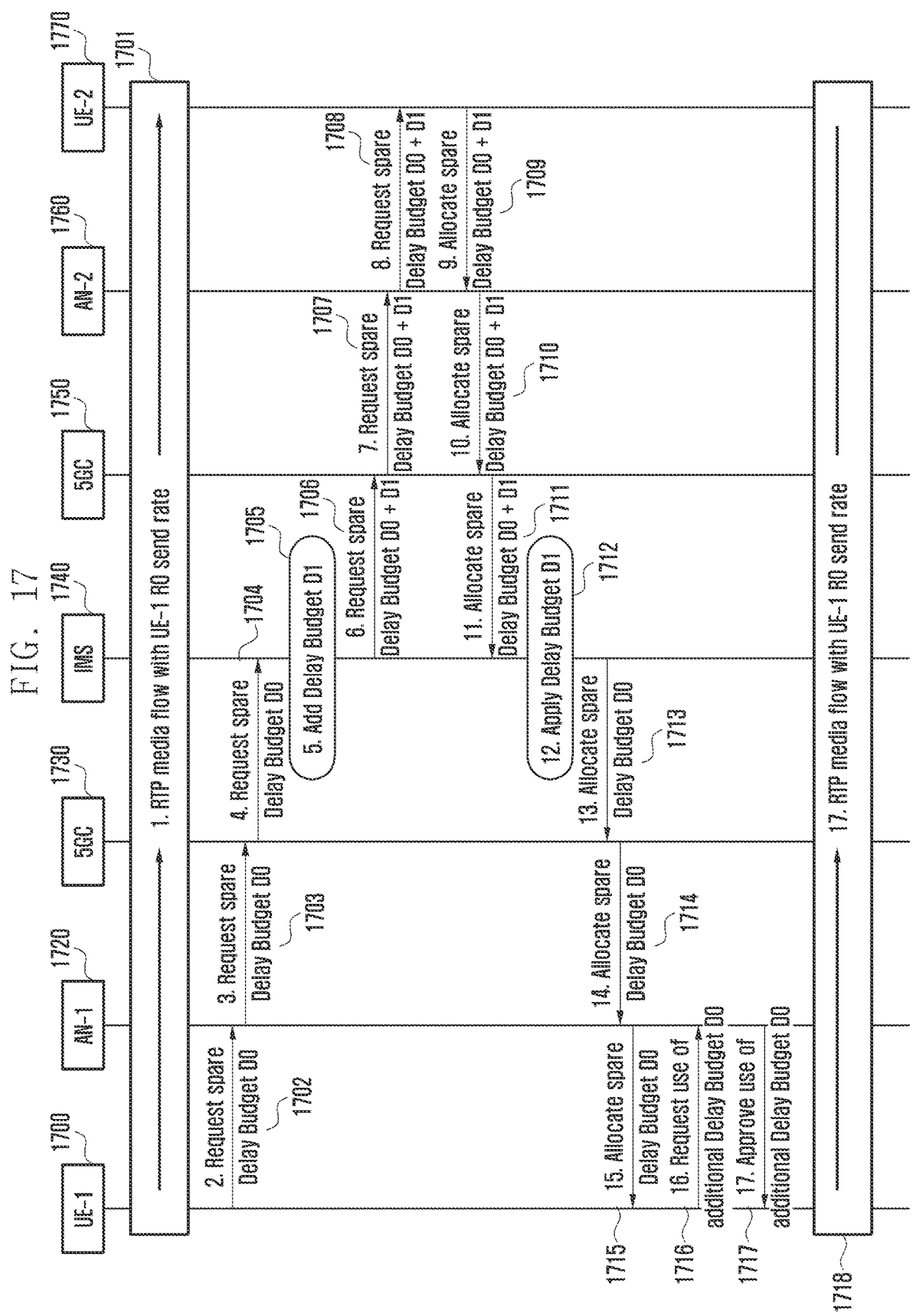
FIG. 17 illustrates an example of procedures for requesting and distributing delay by UE-1, UE-2, and intermediate network nodes, based on the procedures described above according to an embodiment of the disclosure.

FIG. 17 illustrates an example of procedures for requesting and distributing delay by UE-1 1700, UE-2 1770, and intermediate network nodes, on the basis of the procedures described above according to an embodiment of the disclosure.

Referring to FIG. 17, in DBI signaling, media compressed at RO kbps may be transmitted in a direction from UE-1 1700 to UE-2 1770 at operation 1701. UE-1 1700 may transmit, to AN-1 1720, a delay RTCP message for requesting one-way spare delay DO at operation 1702. Thereafter, AN-1 1720 may transmit, to a 5GC 1730, the delay RTCP message for requesting one-way spare delay DO at operation 1703. The 5GC 1730 may transmit, to an IMS 1740, the delay RTCP message for requesting one-way spare delay DO at operation 1704. The delay RTCP message for requesting one-way spare delay DO has proceeded in the direction of UE-2 1770, and the network node 1740 may add information related to delay D1 to be used for a transmission section of itself to the RTCP message at operation 1705. The network node 1740 may transmit, to a 5GC 1750, the delay RTCP message for requesting one-way spare delay DO and added delay D1 at operation 1706. The 5GC 1750 may transmit, to AN-2 1760, the delay RTCP message for requesting one-way spare delay DO and added delay D1 at operation 1707. AN-2 1760 may transmit, to UE-2 1770, the delay RTCP message for requesting one-way spare delay DO and added delay D1 at operation 1708. D1 may be in the same direction as that of DO or in a different direction from that of DO. This message may arrive at UE-2 1770 via an access network and a core connected to the counterpart UE 1700.

UE-2 1770 may transmit, to AN-2 1760, the delay RTCP message for allocation of one-way spare delay DO and added delay D1 at operation 1709. AN-2 1760 may transmit, to the 5GC 1750, the delay RTCP message for allocation of one-way spare delay DO and added delay D1 at operation 1710. The 5GC 1750 may transmit, to the IMS 1740, the delay RTCP message for allocation of one-way spare delay DO and added delay D1 at operation 1711. The delay RTCP message for allocation of spare delay DO and delay D1 has proceeded in the direction of UE-1 1700, and the network node 1740 may apply delay D1 to be used in the transmission section of itself at operation 1712. Then, the network node 1740 may transmit, to the 5GC 1730, delay RTCP message for allocation of one-way spare delay DO at operation 1713. Then, the 5GC 1730 may transmit, to an AN-2 1720, the delay RTCP message for allocation of one-way spare delay DO at operation 1714. Thereafter, AN-2 1760 may transmit, to UE-2 1700, the delay RTCP message for allocation of one-way spare delay DO at operation 1715. UE-1 1700 may request a use of transmission delay DO to be used for AN-1 1720, via an RRC message at operation 1716. Accordingly, AN-1 1720 may approve the use of delay DO at operation 1717. The maintained media compressed at RO kbps may be transmitted in the direction from the terminal of UE-1 1700 to the counterpart terminal of UE-2 1770 at operation 1718.

Figure 18:
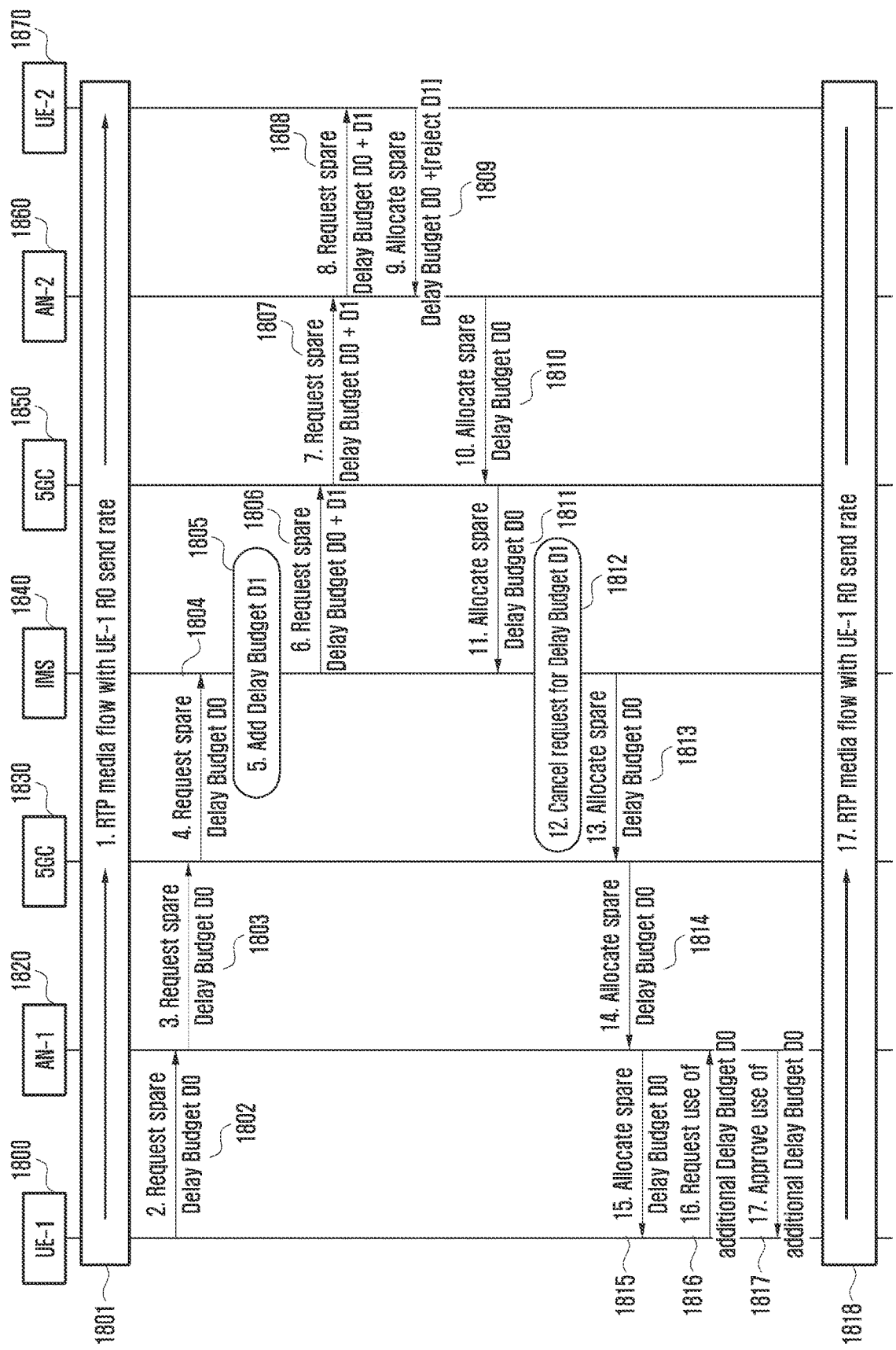
FIG. 18 illustrates another example of the procedures for requesting and distributing delay by UE-1, UE-2, and intermediate network nodes, based on the procedures described above according to an embodiment of the disclosure.

FIG. 18 illustrates another example of the procedure for requesting and distributing delay by UE-1, UE-2, and intermediate network nodes, based on the procedure described above according to an embodiment of the disclosure.

Referring to FIG. 18, in DBI signaling, media compressed at RO kbps may be transmitted in a direction from UE-1 1800 to UE-2 1870 at operation 1801. UE-1 1800 may transmit, to AN-1 1820, a delay RTCP message for requesting one-way spare delay DO at operation 1802. Thereafter, AN-1 1820 may transmit, to a 5GC 1830, the delay RTCP message for requesting one-way spare delay DO at operation 1803. The 5GC 1830 may transmit, to an IMS 1840, the delay RTCP message for requesting one-way spare delay DO at operation 1804. The delay RTCP message for requesting one-way spare delay DO has proceeded in the direction of UE-2 1870, and the network node 1840 may add information related to delay D1 to be used for a transmission section of itself to the RTCP message at operation 1805. The network node 1840 may transmit, to a 5GC 1850, the delay RTCP message for requesting one-way spare delay DO and added delay D1 at operation 1806. The 5GC 1850 may transmit, to AN-2 1860, the delay RTCP message for requesting one-way spare delay DO and added delay D1 at operation 1807. AN-2 1860 may transmit, to UE-2 1870, the delay RTCP message for requesting one-way spare delay DO and added delay D1 at operation 1808. D1 may be in the same direction as that of DO or in a different direction from that of DO. This message may arrive at UE-2 1870 via an access network and a core connected to the counterpart UE 1800.

Depending on a network situation, it may not be possible to accept all delay allocation requests made by the UE or the network node. In FIG. 18, as in the situation illustrated in FIG. 17, each of UE-1 1800 and one network node requests a delay. However, FIG. 18 illustrates a case in which UE-2 1870 allocates only DO requested by UE-1 1800, and rejects allocation of D1 requested by the network node 1840. UE-2 1870 may determine the priority of delay allocation according to Node_ID information related to each request. The returned message may arrive at the network IMS node 1840 having requested D1, via AN-2 1860 and the 5GC 1850. The network node may confirm that the request made thereby has been rejected, delete 4 bytes related to D1, and then forward the RTCP message. This message finally arrives at UE-1 1800 via the 5GC 1830 and AN-1 1820, and UE-1 1800 may request AN-1 1820 to allow application of DO allocated by UE-2 1870, receive approval thereof, and then enable DO to be applied to the corresponding wireless section.

UE-2 1870 may transmit, to AN-2 1860, the delay RTCP message for allocation of one-way spare delay DO and rejection of delay D1 at operation 1809. AN-2 1860 may transmit, to the 5GC 1850, the delay RTCP message for allocation of one-way spare delay DO and rejection of delay D1 at operation 1810. The 5GC 1850 may transmit, to the IMS 1840, the delay RTCP message for allocation of one-way spare delay DO and rejection of delay D1 at operation 1811. The delay RTCP message for allocation of delay DO and rejection of delay D1 has proceeded in the direction of UE-1 1800, and the network node 1840 may cancel the request for delay D1 to be used for the transmission section of itself at operation 1812. The network node 1840 may transmit, to the 5GC 1830, delay RTCP message for allocation of one-way spare delay DO at operation 1813. The 5GC 1830 may transmit, to an AN-2 1860, the delay RTCP message for allocation of one-way spare delay DO at operation 1814. Thereafter, AN-2 1860 may transmit, to UE-2 1800, the delay RTCP message for allocation of one-way spare delay DO at operation 1815. UE-1 1800 may request a use of transmission delay DO to be used for AN-1 1820, via an RRC message at operation 1816. Accordingly, AN-1 1820 may approve the use of delay DO at operation 1817. The maintained media compressed at RO kbps may be transmitted in the direction from the terminal of UE-1 1800 to the counterpart terminal of UE-2 1870 at operation 1818.

Figure 19:
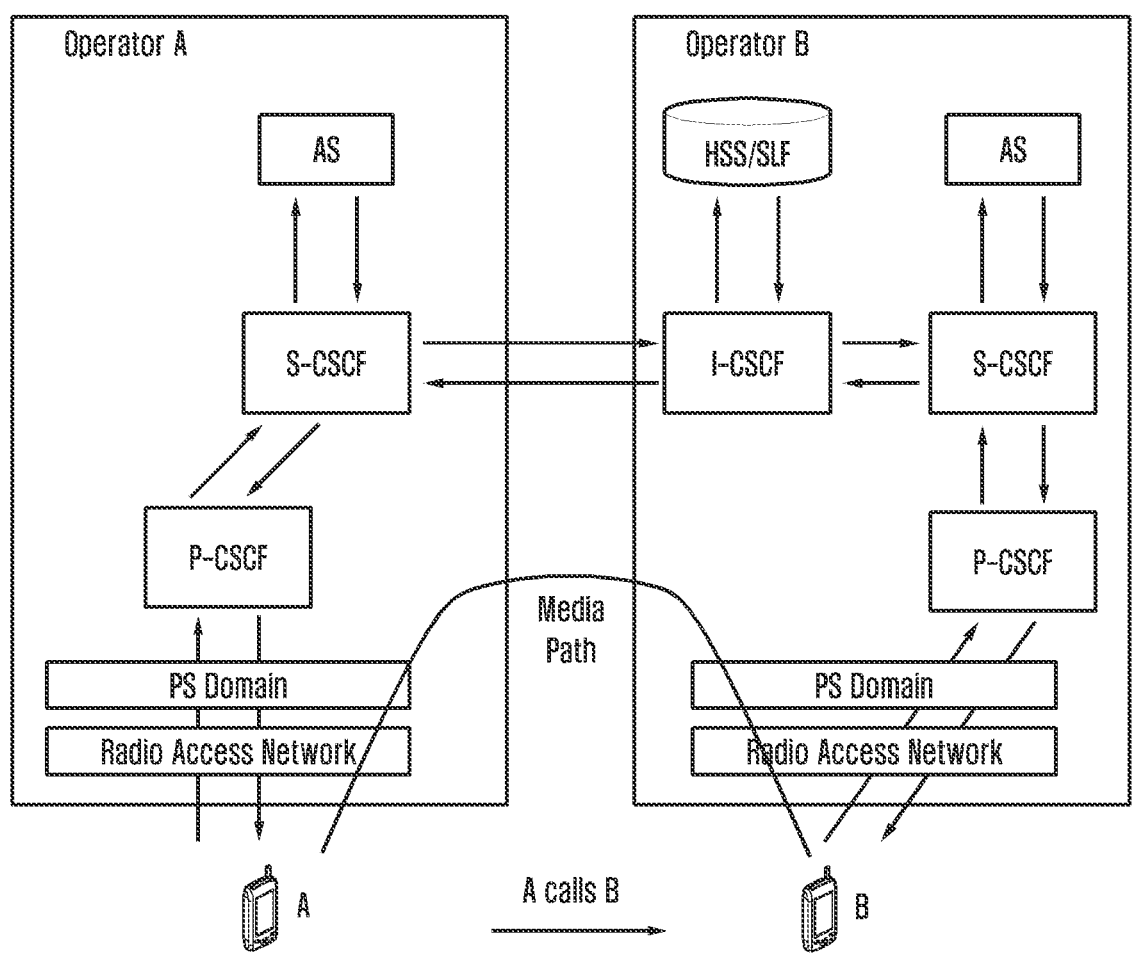
FIG. 19 illustrates another example of the procedures for requesting and distributing delay by UE-1, UE-2, and intermediate network nodes, based on the procedures described above according to an embodiment of the disclosure.

FIG. 19 illustrates another example of the procedure for requesting and distributing delay by UE-1, UE-2, and intermediate network nodes, based on the procedures described above according to an embodiment of the disclosure.

In FIG. 17, an IP multimedia subsystem (IMS) that manages each network is located in the middle of the two core networks (5GC) to which UE-1 and UE-2 are connected, respectively. However, as illustrated in FIG. 19, the IMS may only be used to negotiate or update a call condition. Accordingly, as illustrated in FIG. 5, a media packet or an RTCP packet transmitted by UE-1 may be transmitted to a 5GC of UE-2 via an IP backbone network connecting networks in a DN node that is a part of the 5GC of UE-1.

Referring to FIG. 19, UE-2, which has sufficiently secured a spare delay, may respond by accepting requests of DO and D1, which are made by UE-1 and the network node. Each of A bits in a message, which correspond to UE-1 and the network node, may be configured to 1. The returned message may arrive at the network node having requested D1, via AN-2 and the 5GC, wherein this node identifies the presence of the message including Node_ID of itself, applies allocated D1, deletes 4 bytes related to D1, and then forwards an RTCP message. This message may finally arrive at UE-1 via the 5GC and AN-1, and UE-1 may request AN-1 to allow application of DO allocated by UE-2, receive approval thereof, and then enable application of DO.

Figure 20:
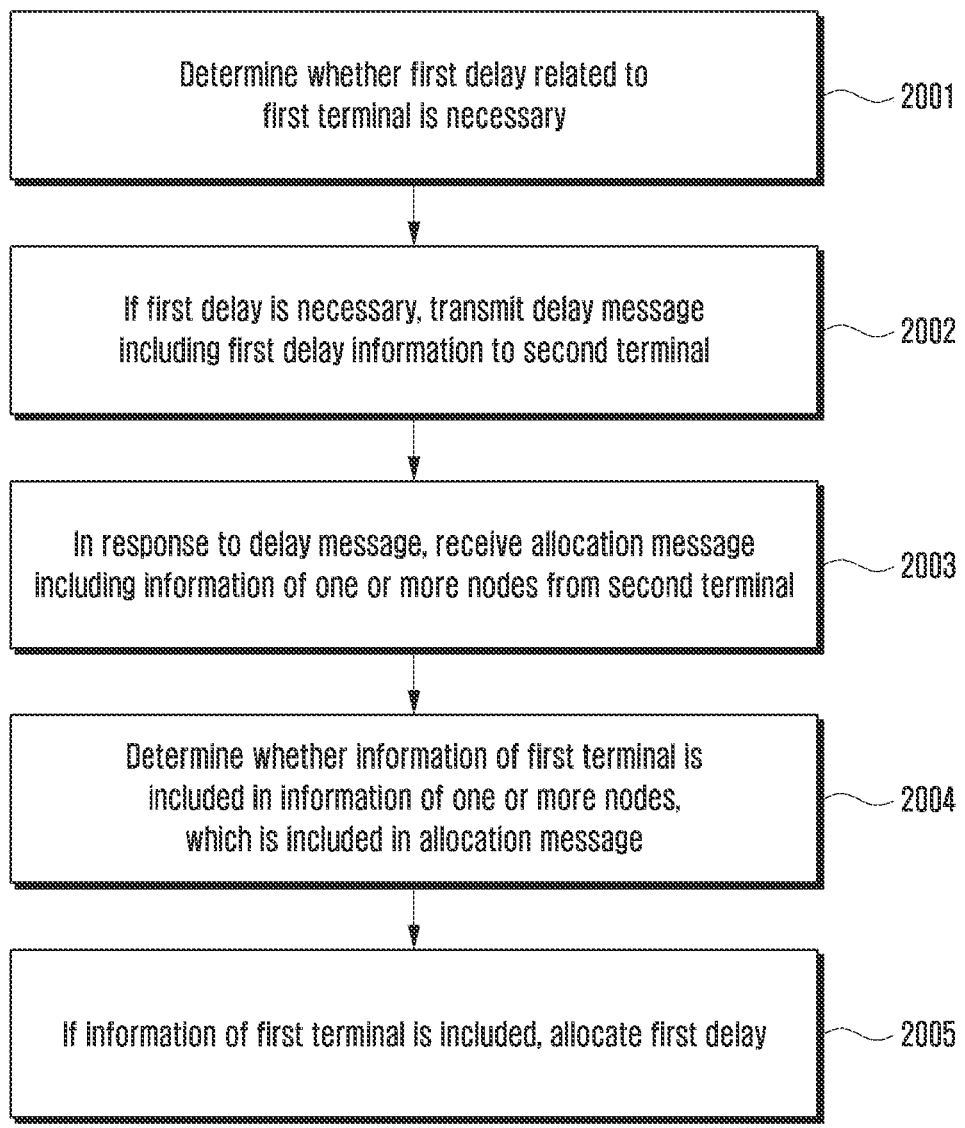
FIG. 20 is a diagram illustrating a method according to an embodiment of the disclosure.

FIG. 20 is a diagram illustrating a method according to an embodiment of the disclosure.

Referring to FIG. 20, a first terminal may determine whether a first delay related to the first terminal is required at operation 2001. If the first delay is required, a delay message including first delay information may be transmitted to a second terminal at operation 2002. In response to the delay message, an allocation message including information on one or more nodes may be received from the second terminal at operation 2003. The delay message and the allocation message may be a real-time transport protocol control protocol (RTCP) message. The RTCP message may include at least one of direction information, allocation information, and information of one or more nodes to be allocated, and the delay message and the allocation message may be determined by at least one of the direction information, the allocation information, and the information of one or more nodes to be allocated. Whether information of the first terminal is included in the information of one or more nodes, which is included in the allocation message, may be determined at operation 2004. If the information of the first terminal is included, the first delay may be allocated at operation 2005.

Figure 21:
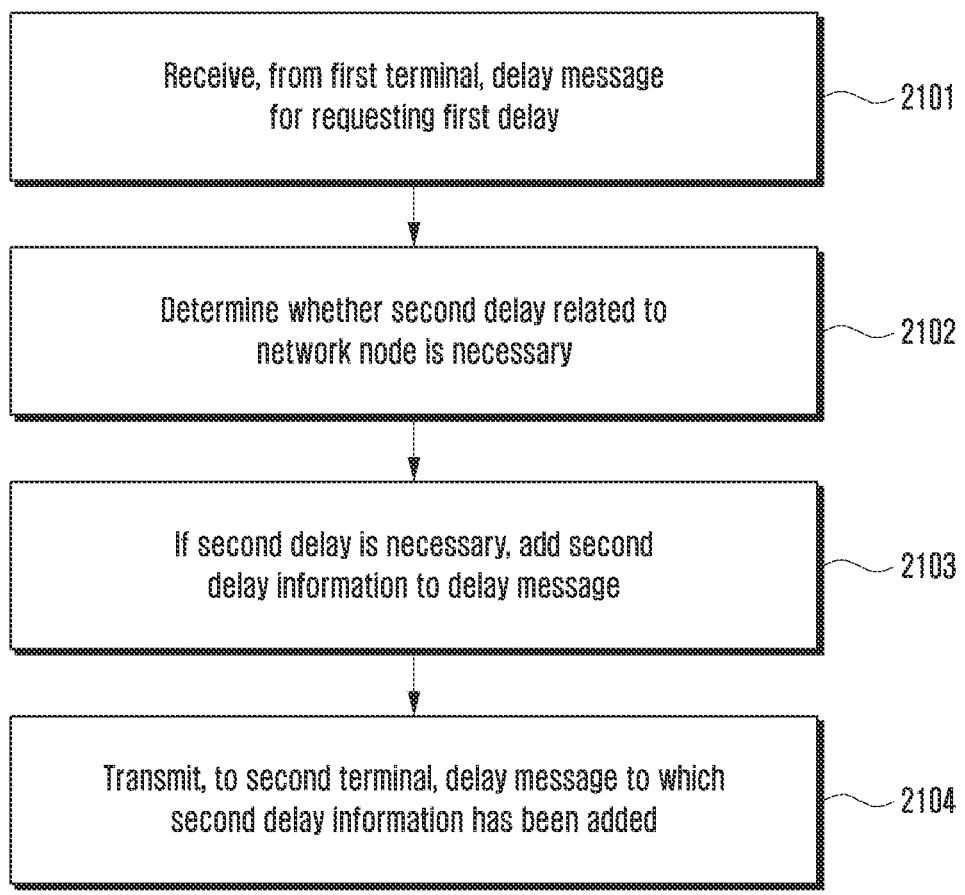
FIG. 21 is a diagram illustrating a method according to an embodiment of the disclosure.

FIG. 21 is a diagram illustrating a method according to an embodiment of the disclosure.

Referring to FIG. 21, a network node may receive a delay message for requesting a first delay from a first terminal at operation 2101. The delay message may be a real-time transport protocol control protocol (RTCP) message, wherein the RTCP message includes at least one of direction information, allocation information, and information of one or more nodes to be allocated, and the delay message is determined by at least one of the direction information, the allocation information, and the information of one or more nodes to be allocated. Whether a second delay related to the network node is required may be determined at operation 2102. If the second delay is required, second delay information may be added to the delay message at operation 2103. The delay message, to which the second delay information has been added, may be transmitted to the second terminal at operation 2104.

Figure 22:
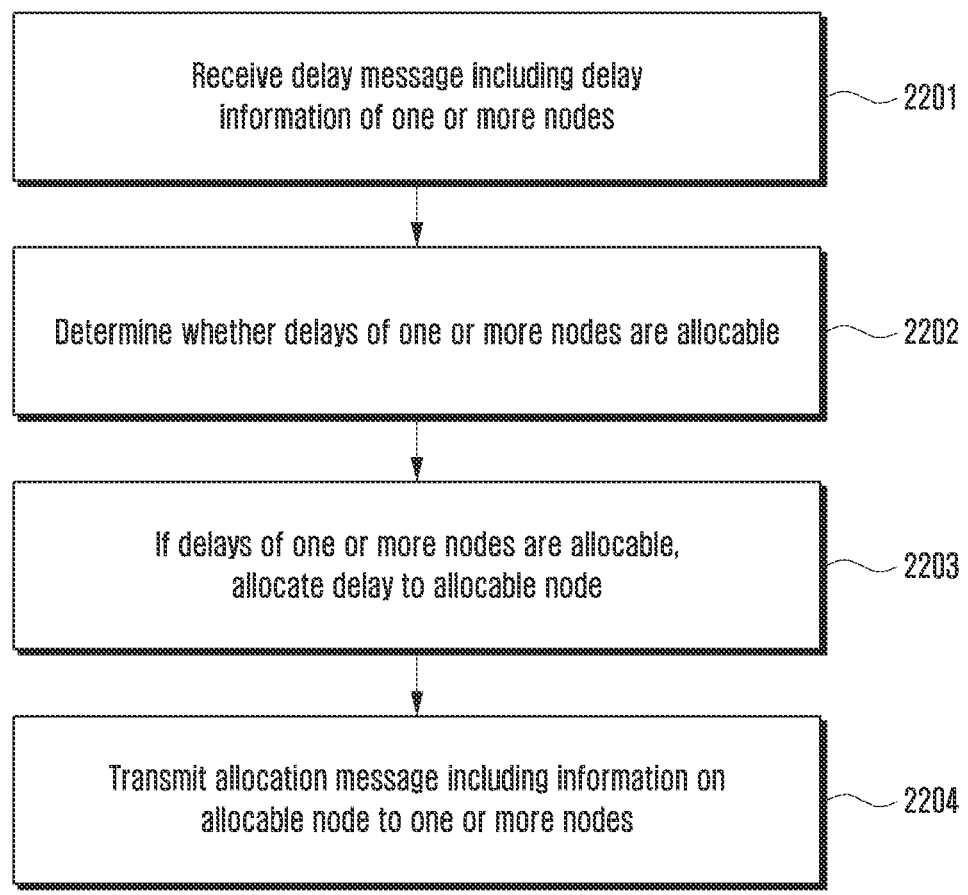
FIG. 22 is a diagram illustrating a method according to an embodiment of the disclosure.

FIG. 22 is a diagram illustrating a method according to an embodiment of the disclosure.

Referring to FIG. 22, a second terminal may receive a delay message including delay information of one or more nodes at operation 2201. Whether it is possible to allocate delays of the one or more nodes may be determined at operation 2202. If it is possible to allocate delays of the one or more nodes, the delays may be allocated to allocable nodes at operation 220. An allocation message including information on the allocable nodes is transmitted to the one or more nodes at operation 2204. The delay message and the allocation message may be a real-time transport protocol control protocol (RTCP) message. The RTCP message may include at least one of direction information, allocation information, and information of one or more nodes to be allocated, and the delay message and the allocation message may be determined by at least one of the direction information, the allocation information, and the information of one or more nodes to be allocated.

Figure 23:
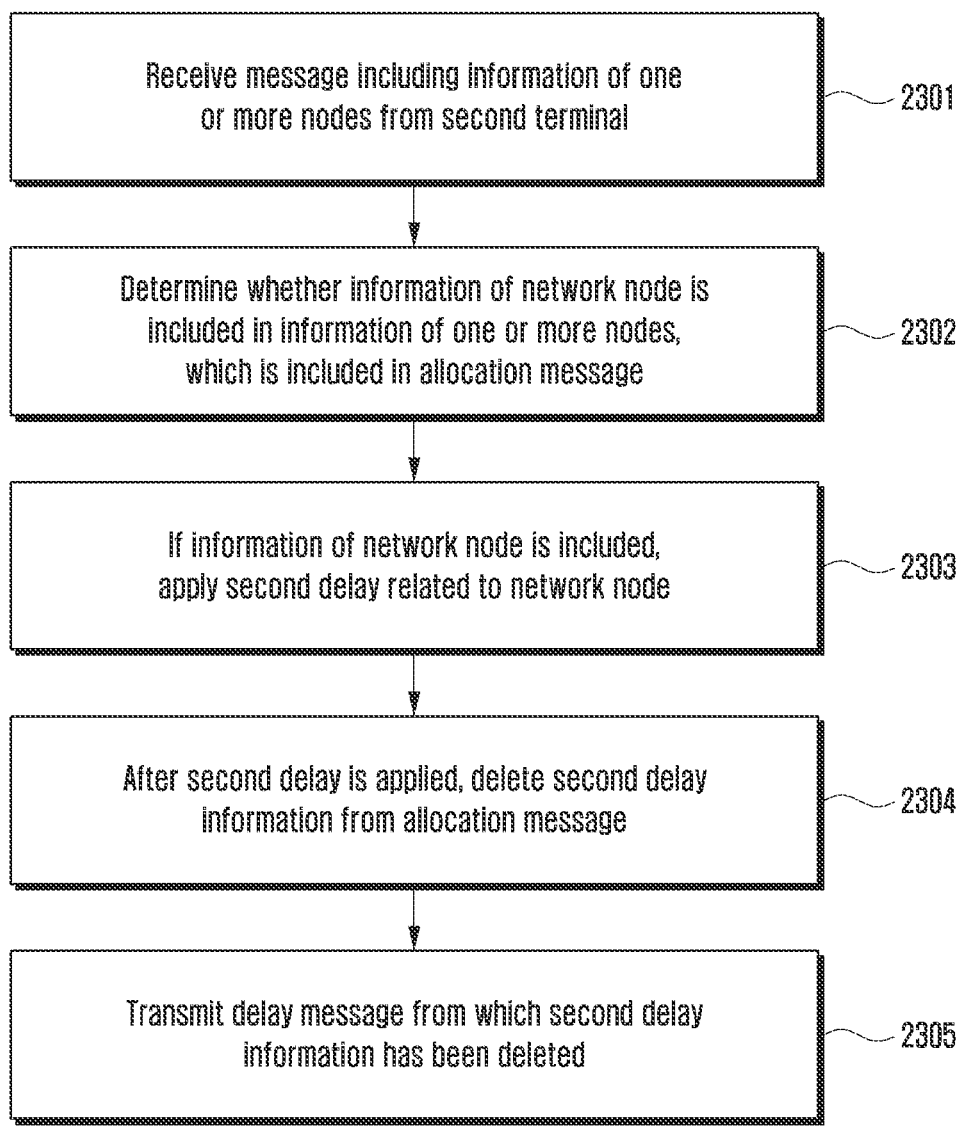
FIG. 23 is a diagram illustrating a method according to an embodiment of the disclosure.

FIG. 23 is a diagram illustrating a method according to an embodiment of the disclosure.

Referring to FIG. 23, a network node may receive an allocation message including information on one or more nodes from a second terminal at operation 2301. The allocation message may be a real-time transport protocol control protocol (RTCP) message, wherein the RTCP message includes at least one of direction information, allocation information, and information of one or more nodes to be allocated, and the delay message is determined by at least one of the direction information, the allocation information, and the information of one or more nodes to be allocated. Whether information of the network node is included in the information of one or more nodes, which is included in the allocation message, may be determined at operation 2302. If the information of the network node is included, a second delay related to the network node may be applied at operation 2303. After application of the second delay, second delay information may be deleted from the allocation message at operation 2304. The delay message, from which the second delay information has been deleted, may be transmitted at operation 2305.

Figure 24:
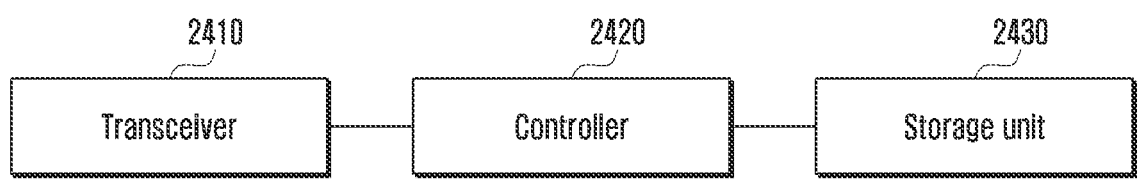
FIG. 24 is a diagram illustrating a structure of a terminal according to an embodiment of the disclosure.

FIG. 24 is a diagram illustrating a structure of a terminal according to an embodiment according to an embodiment of the disclosure.

Referring to FIG. 24, a terminal may include a transceiver 2410, a controller 2420, and a storage unit 2430. In the disclosure, the controller may be defined as a circuit, an application-specific integrated circuit, or at least one processor.

The transceiver 2410 may transmit a signal to or receive a signal from another network entity. The transceiver 2410 may receive, for example, system information from a network node, and may receive a synchronization signal or a reference signal.

The controller 2420 may control overall operations of the terminal according to the embodiment proposed in the disclosure. For example, the controller 2420 may control signal flows between respective blocks to perform operations according to the above-described flowchart. The controller 2420 may control an operation proposed in the disclosure in order to receive residual system information (RMSI) in a multi-beam-based system according to an embodiment.

The storage unit 2430 may store at least one of information transmitted or received via the transceiver 2410 and information generated via the controller 2420. For example, the storage unit 2430 may store scheduling information related to RMSI transmission, an RMSI-related PDCCH time axis position, period information, etc.

Figure 25:
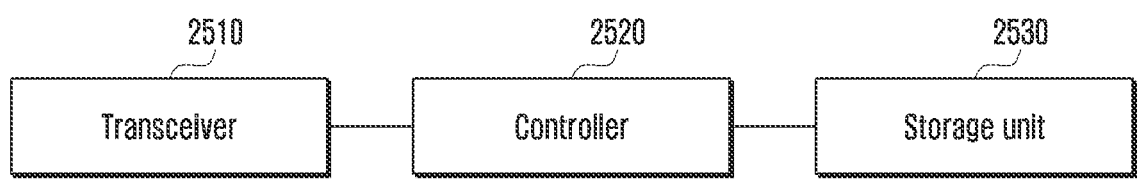
FIG. 25 is a diagram illustrating a structure of a network node according to an embodiment of the disclosure.

FIG. 25 is a diagram illustrating a structure of a network node according to an embodiment of the disclosure.

Referring to FIG. 25, a network node may include a transceiver 2510, a controller 2520, and a storage unit 2530. In the disclosure, the controller may be defined as a circuit, an application-specific integrated circuit, or at least one processor.

The transceiver 2510 may transmit a signal to or receive a signal from another network node. The transceiver 2510 may transmit, for example, system information to a terminal and may transmit a synchronization signal or a reference signal.

The controller 2520 may control overall operations of the network node according to the embodiment proposed in the disclosure. For example, the controller 2520 may control signal flows between respective blocks to perform operations according to the above-described flowchart. Specifically, the controller 2520 may control an operation proposed in the disclosure in order to transmit residual system information (RMSI) in a multi-beam-based system according to an embodiment.

The storage unit 2530 may store at least one of information transmitted or received via the transceiver 2510 and information generated via the controller 2520. For example, the storage unit 2530 may store scheduling information related to RMSI transmission, an RMSI-related PDCCH time axis position and period information, etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal, the method comprising:
determining whether a first delay related to the first terminal is necessary;
transmitting, to a second terminal, a delay message including first delay information in case that the first delay is necessary;
in response to the delay message, receiving, from the second terminal, an allocation message including information on one or more nodes located in a transmission path between the first terminal and the second terminal;
determining whether information on the first terminal is included in the information on one or more nodes included in the allocation message; and allocating the first delay in case that the information on the first terminal is included in the information on one or more nodes,
wherein the delay message and the allocation message are a real-time transport protocol control protocol (RTCP) message including direction information, allocation information, and information on one or more nodes to be allocated.

2. The method of claim 1,
wherein the delay message and the allocation message are determined by the at least one of the direction information, the allocation information, or the information on one or more nodes to be allocated.

3. The method of claim 1, wherein, in case that a network node receives a delay message for requesting a first delay from the first terminal, the network node:
determines whether a second delay related to the network node is necessary; and
transmits, to a second terminal, the delay message to which second delay information has been added in case that the second delay is necessary.

4. The method of claim 3,
wherein the delay message is determined by the at least one of the direction information, the allocation information, or the information on one or more nodes to be allocated.

5. A method performed by a second terminal, the method comprising:
receiving a delay message including delay information on one or more nodes located in a transmission path between a first terminal and the second terminal;
determining whether delays of the one or more nodes are allocable;
allocating a delay to an allocable node in case that the delays of the one or more nodes are allocable; and
transmitting, to the one or more nodes, an allocation message including information on the allocable node,
wherein the delay message and the allocation message are a real-time transport protocol control protocol (RTCP) message including direction information, allocation information, and information on one or more nodes to be allocated.

6. The method of claim 5,
wherein the delay message and the allocation message are determined by the at least one of the direction information, the allocation information, and the information on one or more nodes to be allocated.

7. A method for allocating a delay of a network node, the method comprising:
receiving, from a second terminal, an allocation message including information on one or more nodes located in a transmission path between a first terminal and the second terminal;
determining whether information on the network node is included in the information on one or more nodes included in the allocation message;
applying a second delay related to the network node in case that the information on the network node is included in the information on one or more nodes;
after the second delay is applied, deleting second delay information from the allocation message; and
transmitting a delay message from which the second delay information has been deleted,
wherein the delay message and the allocation message are a real-time transport protocol control protocol (RTCP) message including direction information, allocation information, and information on one or more nodes to be allocated.

8. The method of claim 7,
wherein the allocation message is determined by the at least one of the direction information, the allocation information, or the information on one or more nodes to be allocated.

9. A first terminal comprising:
a transceiver configured to transmit or receive at least one signal; and
a controller coupled with the transceiver,
wherein the controller is configured to:
determine whether a first delay related to the first terminal is necessary,
transmit, to a second terminal, a delay message including first delay information in case that the first delay is necessary,
in response to the delay message, receive, from the second terminal, an allocation message including information on one or more nodes located in a transmission path between the first terminal and the second terminal,
determine whether information on the first terminal is included in the information on one or more nodes included in the allocation message, and
allocate the first delay in case that the information on the first terminal is included in the information on one or more nodes,
wherein the delay message and the allocation message are a real-time transport protocol control protocol (RTCP) message including direction information, allocation information, and information on one or more nodes to be allocated.

10. The first terminal of claim 9,
wherein the delay message and the allocation message are determined by the at least one of the direction information, the allocation information, or the information on one or more nodes to be allocated.

11. The first terminal of claim 9, wherein, in case that a network node receives a delay message for requesting a first delay from the first terminal, the network node:
determines whether a second delay related to the network node is necessary, and
transmits to a second terminal, the delay message to which second delay information has been added in case that the second delay is necessary.

12. The network node of claim 11,
wherein the delay message is determined by the at least one of the direction information, the allocation information, or the information on one or more nodes to be allocated.

13. A second terminal comprising:
a transceiver capable of transmitting or receiving at least one signal; and
a controller coupled with the transceiver,
wherein the controller is configured to:
receive a delay message including delay information on one or more nodes located in a transmission path between a first terminal and the second terminal,
determine whether delays of the one or more nodes are allocable,
allocate a delay to an allocable node in case that the delays of the one or more nodes are allocable, and
transmit, to the one or more nodes, an allocation message including information on the allocable node, wherein the delay message and the allocation message are a real-time transport protocol control protocol (RTCP) message including direction information, allocation information, and information on one or more nodes to be allocated.

14. The second terminal of claimer 13,
wherein the delay message and the allocation message are determined by the at least one of the direction information, the allocation information, or the information on one or more nodes to be allocated.

15. A network node comprising:
a transceiver capable of transmitting or receiving at least one signal; and
a controller coupled with the transceiver,
wherein the controller is configured to:
receive, from a second terminal, an allocation message including information on one or more nodes located in a transmission path between a first terminal and the second terminal,
determine whether information on the network node is included in the information on one or more nodes included in the allocation message,
apply a second delay related to the network node in case that the information on the network node is included in the information on one or more nodes,
after the second delay is applied, delete second delay information from the allocation message, and
transmit a delay message from which the second delay information has been deleted,
wherein the delay message and the allocation message are a real-time transport protocol control protocol (RTCP) message including direction information, allocation information, and information on one or more nodes to be allocated.

16. The network node of claim 15,
wherein the allocation message is determined by the at least one of the direction information, the allocation information, or the information on one or more nodes to be allocated.

* * * * *